United States Patent
Matsushima

(10) Patent No.: US 7,760,301 B2
(45) Date of Patent: Jul. 20, 2010

(54) LIQUID CRYSTAL DEVICE AND ELECTRONIC APPARATUS

(75) Inventor: Toshiharu Matsushima, Azumino (JP)

(73) Assignee: Sony Corporation, Tokyo (JP)

( * ) Notice: Subject to any disclaimer, the term of this patent is extended or adjusted under 35 U.S.C. 154(b) by 264 days.

(21) Appl. No.: 11/925,372

(22) Filed: Oct. 26, 2007

(65) Prior Publication Data

US 2008/0117364 A1 May 22, 2008

(30) Foreign Application Priority Data

Oct. 30, 2006 (JP) .............................. 2006-293626

(51) Int. Cl.
*G02F 1/1337* (2006.01)
(52) U.S. Cl. .................................................. 349/123
(58) Field of Classification Search .................. 349/123
See application file for complete search history.

(56) References Cited

U.S. PATENT DOCUMENTS 7,528,913 B2 * 5/2009 Kobayashi .................. 349/117
2006/0158590 A1 7/2006 Matsushima

FOREIGN PATENT DOCUMENTS

| JP | 2004-361917 A | 12/2004 |
| JP | 2005-275342 A | 10/2005 |
| JP | 2006-64882 A | 3/2006 |
| JP | 2006-72239 A | 3/2006 |
| JP | 2006-106439 A1 | 4/2006 |
| JP | 2006201326 A | 8/2006 |

OTHER PUBLICATIONS

H.S. Jin et al.; "P-139: Novel Viewing-Angle Controllable TFT-LCD"; SID 06 DIGEST; ISSN0006-0966X/06/3701-0729; pp. 729-731; Kyongki-do, Korea.

* cited by examiner

*Primary Examiner*—Jerry T Rahll
(74) *Attorney, Agent, or Firm*—K&L Gates LLP

(57) ABSTRACT

A liquid crystal device includes a pair of polarizing plates having a transmission axis; a display panel being disposed between the pair of polarizing plates and having a function of displaying an image; and a viewing angle control panel having a liquid crystal layer that is disposed at a position adjacent to one of the pair of polarizing plates between the pair of polarizing plates with liquid crystal molecules aligned in a predetermined direction and controlling a viewing angle of a display on the display panel, wherein the alignment direction of the liquid crystal molecules of the viewing angle control panel is substantially parallel or perpendicular to a transmission axis of the one polarizing plate.

7 Claims, 14 Drawing Sheets

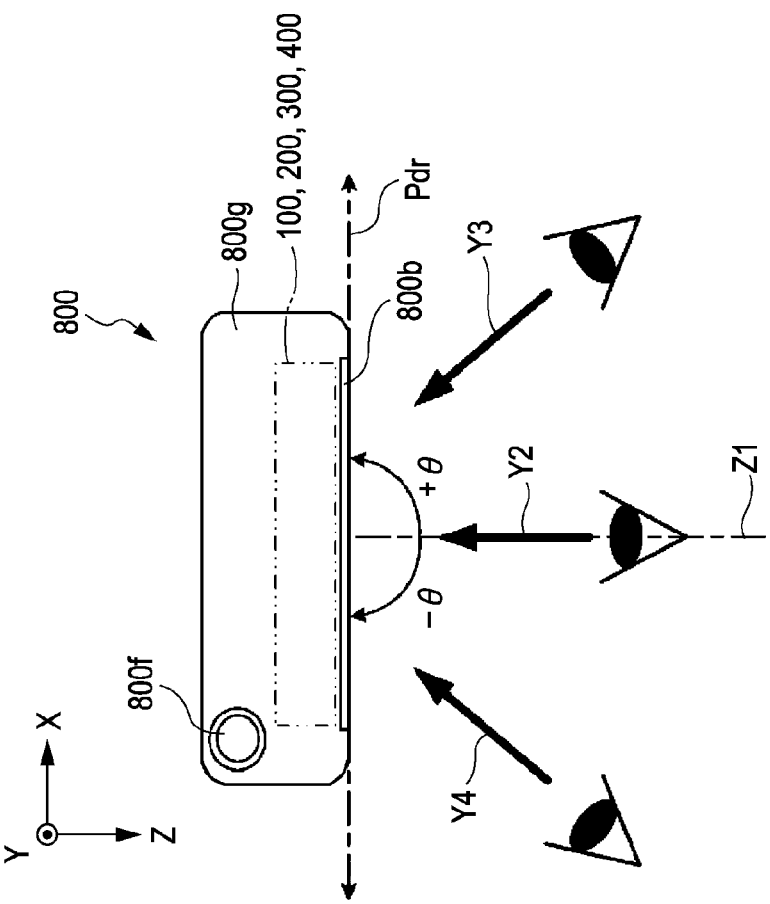
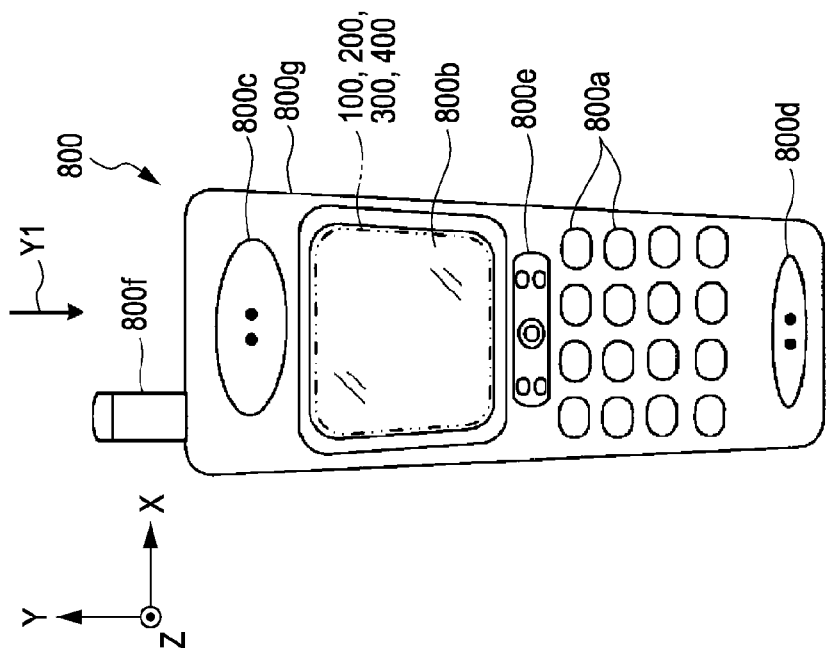

LIQUID CRYSTAL DEVICE AND ELECTRONIC APPARATUS

The entire disclosure of Japanese Patent Application No. 2006-293626, filed Oct. 30, 2006 is expressly incorporated by reference herein.

BACKGROUND

1. Technical Field

The present invention relates to a liquid crystal device and an electronic apparatus capable of switching between both wide viewing angle and narrow viewing angle display modes.

2. Related Art

Recently, it is required that display devices such as laptop computers and cellular phones have wide viewing angle characteristics so as to be normally viewed from any direction. Alternatively, when the display devices are used outside or in public places, users of the devices generally dislike other people viewing images displayed on the devices. In this case, narrow viewing angle characteristics is required. For this reason, there have been suggested various display devices capable of switching between a wide viewing angle state and a narrow viewing angle state (for example, see JP-A-2006-64882, JP-A-2006-72239, JP-A-2006-106439, JP-A-2004-361917, and JP-A-2005-275342).

For example, the display devices capable of overlapping another image on the displayed image to conceal it when viewed from a specific direction by switching the display mode are disclosed in JP-A-2006-64882 and JP-A-2006-72239.

A display device capable of switching between a wide viewing angle display mode and a narrow viewing angle display mode is disclosed in JP-A-2006-106439. In the device, a viewing angle in both vertical and horizontal directions can be controlled in the narrow viewing angle display mode and image confirmation from the viewing angle in both vertical and horizontal directions can be prevented.

A viewing angle controlling element and a display device capable of obtaining a high information confidentiality without a negative effect on the brightness of transmitted light and capable of dynamically changing viewing angle corresponding to the necessity of information confidentiality are disclosed in JP-A-2004-361917. In addition, the viewing angle controlling element having high capability to switch between the wide viewing angle and the narrow viewing angle and the liquid crystal display device using the same are disclosed in JP-A-2005-275342.

Besides, there is a known technology where the brightness of a display image is darkened when viewed from an oblique direction by attaching an optic film capable of controlling an irradiation range of illumination light irradiated from a back light to a display panel to a display screen of a display device.

In this case, controlling the viewing angles to achieve the above-described objects means that it is good for images (display images) not to be viewed when the display device from the oblique direction is viewed. In order to achieve the objects, it is not required that the brightness of the images be darkened like in the above-described documents and the technology, but it is advantageous to lower the contrast of an image instead.

SUMMARY

An advantage of some aspects of the invention is that it provides a liquid crystal device that has both a wide viewing angle display mode and a narrow viewing angle display mode and is capable of lowering a contrast of an image when viewed from a specific direction in the narrow viewing angle display mode and an electronic apparatus to which the same is applied.

According to an aspect of the invention, there is provided a liquid crystal device including a pair of polarizing plates having a transmission axis; a display panel being disposed between the pair of polarizing plates and having a function of displaying an image; and a viewing angle control panel having a liquid crystal layer that is disposed at a position adjacent to one of the pair of polarizing plates between the pair of polarizing plates with liquid crystal molecules aligned in a predetermined direction and controlling a viewing angle of a display on the display panel, wherein the alignment direction of the liquid crystal molecules of the viewing angle control panel is substantially parallel or perpendicular to a transmission axis of the one polarizing plate.

The liquid crystal device includes the pair of polarizing plates having the transmission axis, the display panel being disposed between the pair of polarizing plates and having a function of displaying the images such as characters, figures, photos, and so on, and the viewing angle control panel having the liquid crystal layer that is disposed at the position adjacent to one of the pair of polarizing plates between the pair of polarizing plates with the liquid crystal molecules aligned in the predetermined direction (for example, homogeneous alignment, hybrid alignment, etc.), and controlling the viewing angle of the display on the display panel.

Moreover, the alignment direction (direction of a liquid crystal alignment axis) of the liquid crystal molecules of the viewing angle control panel is substantially parallel or perpendicular to the transmission axis of the one polarizing plate. Accordingly, a range of the viewing angle of a polar angle direction substantially perpendicular to the alignment direction of the liquid crystal molecules of the viewing angle control panel can be limited, and specifically, the contrast of the image can be lowered. For example, the viewing angle control panel of the liquid crystal device can be disposed so that the alignment direction of the liquid crystal molecules of the viewing angle control panel is a vertical direction with respect to an image surface when the images are viewed from a front side. Accordingly, the viewing angle of a horizontal direction (direction of 3 o'clock to 9 o'clock direction in a clockwise direction) can be limited. That is, the contrast of the images can be lowered. As a result, it is possible to prevent other people from viewing the image except for a user.

In the liquid crystal device, the one polarizing plate may be disposed on a viewing side in which the image on the display panel can be viewed. In addition, in the liquid crystal device, light reaching the viewing angle control panel through the polarizing plates may be substantially linearly polarized and the alignment direction of the liquid crystal molecules of the viewing angle control panel may be substantially parallel or perpendicular to the transmission axis of the substantially linearly polarized light. Further, in the liquid crystal device, the display panel may have a liquid crystal layer in which the dielectric anisotropy is negative and has a vertical alignment mode in which circularly polarized light is emitted toward the viewing angle control panel, and a phase difference film for converting the circularly polarized light into linearly polarized light may be provided between the display panel and the viewing angle control panel.

The liquid crystal device may include a viewing angle control circuit outputting a viewing angle control signal for driving the liquid crystal layer of the viewing angle control panel to the viewing angle control panel. In the liquid crystal device, the viewing angle control panel may be switched to any one of a wide viewing angle display mode for gaining a wide viewing angle and a narrow viewing angle display mode for gaining a narrow viewing angle on the basis of the viewing angle control signal output from the viewing angle control circuit.

In the liquid crystal device, a range of the viewing angle in the narrow viewing angle display mode may be adjusted by changing a product Δnd of a refractive anisotropy Δn of the liquid crystal layer of the viewing angle control panel and a thickness d of the liquid crystal layer.

In the liquid crystal device, the display panel may have a configuration in which a liquid crystal layer is interposed between a pair of substrates opposed to each other, one of the pair of substrates may be an array substrate which has a common electrode and a pixel electrode and in which the liquid crystal layer is driven by a transverse electric field generated between the common electrode and the pixel electrode, and the viewing angle control panel may be disposed at a position adjacent to the other substrate, but not the array substrate.

Since the electrodes for driving the liquid crystal are formed only in the array substrate of the pair of the substrates interposing the liquid crystal layer, the display panel of a transverse electric field mode has a weak configuration with respect to static electricity. For this reason, in order to solve this problem, in this display panel, a protective film of the static electricity made of ITO and the like is generally formed on an entire surface of the exterior substrate (opposite side of the liquid crystal layer) of the other substrate opposite the array substrate. Besides, the potential of the protective film of the static electricity is changed to that of GND (ground). However, like the liquid crystal device, when the viewing angle control panel is disposed at the surface of the exterior substrate (opposite side of the liquid crystal layer) having no electrode, it is possible to carry out the same function of protective film of the static electricity without a supply of such a protective film of the static electricity.

The liquid crystal device may have another viewing angle control panel having a liquid crystal layer disposed between the pair of polarizing plates with the liquid crystal molecules aligned in a predetermined direction and controlling a viewing angle of the display panel. In the liquid crystal device, the alignment direction of the liquid crystal molecules of the viewing angle control panel may be substantially perpendicular to the alignment direction of the liquid crystal molecules of another viewing angle control panel.

According to another aspect of the invention, there is provided an electronic apparatus including the above-described liquid crystal device as a display unit. According to such a configuration, for example, it is possible to configure the electronic apparatus capable of having both wide viewing angle display mode and narrow viewing angle display mode and lowering the contrast of the image when viewed from a specific direction in the narrow viewing angle display mode.

BRIEF DESCRIPTION OF THE DRAWINGS

The invention will be described with reference to the accompanying drawings, wherein like numbers reference like elements.

FIGS. 1A and 1B are a front view and one side view illustrating a configuration of a cellular phone according to embodiments of the invention, respectively.

DESCRIPTION OF EXEMPLARY EMBODIMENTS

Figure 2:
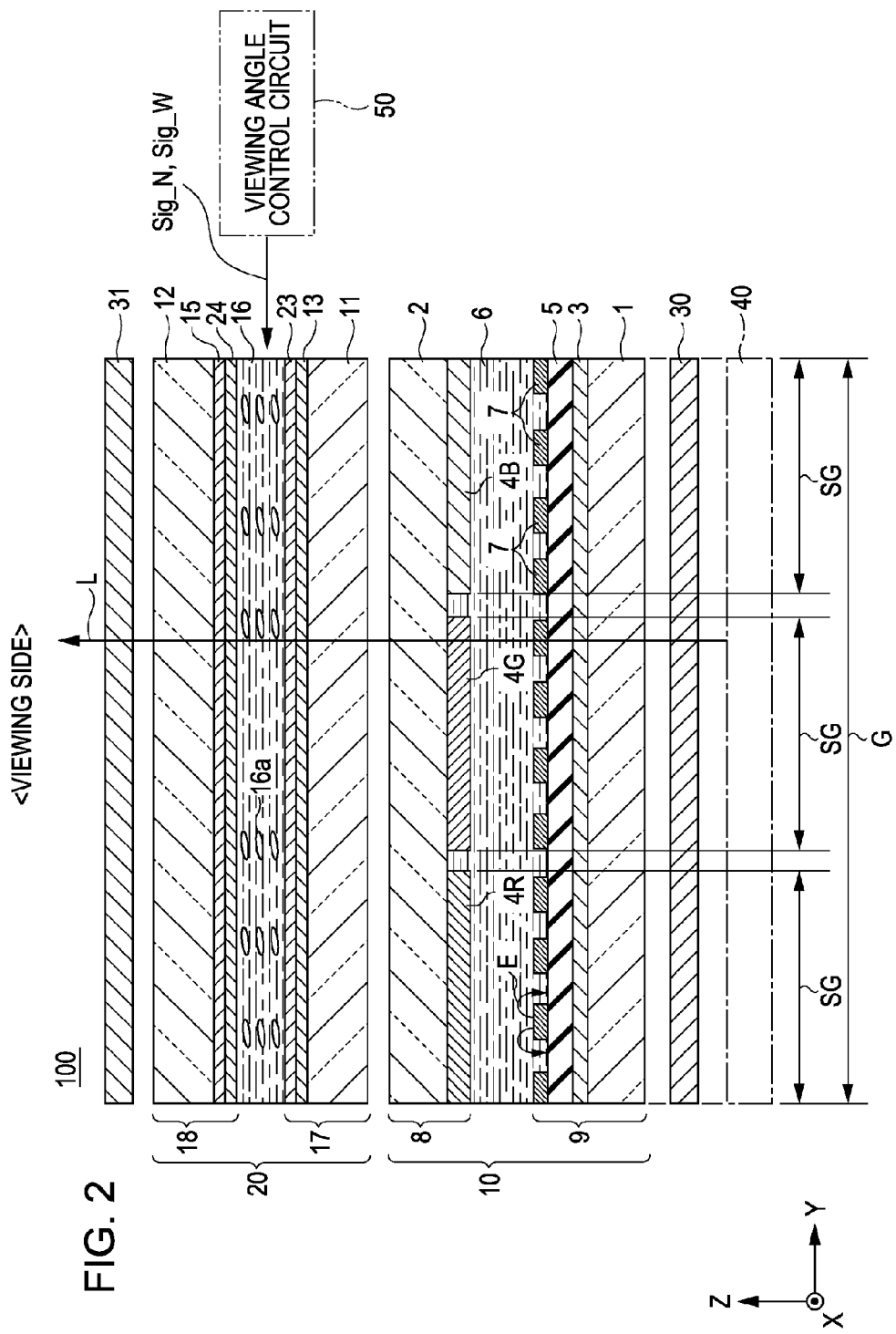
FIG. 2 is a sectional view illustrating a configuration of a liquid crystal device according to a first embodiment of the invention.

Hereinafter, exemplary embodiments of the invention will be described with reference to the drawings.

Electronic Apparatus

FIG. 1A is a front view illustrating a cellular phone 800 using a liquid crystal device according to various embodiments of the invention when viewed from a display surface side. FIG. 1B is one side view illustrating the cellular phone 800 when the cellular phone 800 shown in FIG. 1A is viewed from a transmitting/receiving antenna 800f side (an arrow Y1 direction). Hereinafter, a thickness direction of the cellular phone 800 according to the invention is a Z direction. A vertical direction and a horizontal direction of the cellular phone 800 shown in FIG. 1A are a Y direction and an X direction, respectively. In addition, a direction Pdr of polar angles is a direction of angles oblique by ±θ in the horizontal direction with respect to a normal line direction Z1 of a display unit 800b (or a liquid crystal device 100 described below) of the cellular phone 800.

The cellular phone 800 includes a plurality of operation buttons 800a for allowing input operations such as an e-mail to be sent, the display unit 800*b* for displaying images (display images) such as characters, figures, and photos, an earpiece 800*c*, a mouthpiece 800*d*, function operation buttons 800*e*, and the transmitting/receiving antenna 800*f* provided on one surface of a case 800*g*. Liquid crystal devices 100, 200, 300, 400, etc. according to the invention are accommodated in the inside of the case 800*g* and in a position corresponding to the display unit 800*b*. For this reason, in such a cellular phone 800, a user can operate the operation buttons 800*a*, the function operation buttons 800*e*, or the like to display the images on the display unit 800*b*.

In particular, in the cellular phone 800 according to the invention, a user can selectively switch between a wide viewing angle display mode for viewing the display image from any direction when used normally and a narrow viewing angle display mode for lowering the contrast of the display image such as an e-mail, a photo, etc. When using it outside, in public places, or the like to allow other people not to view the display image. In addition, a user can switch between the wide viewing angle display mode and the narrow viewing angle display mode by operating the operation buttons 800*a* or the function operation buttons 800*e*.

In the cellular phone 800, a user can select the wide viewing angle display mode. In this case, in FIG. 1B, when the display unit 800*b* is viewed from a front direction Y2 (Z direction) that is the normal line direction, when the display unit 800*b* is viewed from a right inclination direction Y3 (+polar angle direction Pdr) oblique by +θ° from the normal line direction Z1 with respect to the display surface of the display unit 800*b*, and when the display unit 800*b* is viewed from a left inclination direction Y4 (−polar angle direction Pdr) oblique by −θ° from the normal line direction Z1 with respect to the display surface of the display unit 800*b*, the display image can be viewed. Alternatively, a user can select the narrow viewing angle display mode. In this case, in FIG. 1B, when the display unit 800*b* is viewed from the normal line direction Z1, the display image with a high contrast can be viewed. However, when the display unit 800*b* is viewed from the right inclination direction Y3 (particularly, +40° or more) and the left inclination direction Y4 (particularly, −40° or more), the display mode with a considerable lowered contrast is displayed. As a result, it is difficult to view the display image.

Hereinafter, according to the embodiments of the invention, configurations of the liquid crystal devices mounted in a position corresponding to the display unit 800*b* of the cellular phone 800 will be described. X, Y, and Z directions of the liquid crystal device according to the invention correspond to the X, Y, and Z directions of the cellular phone 800 shown in FIGS. 1A and 1B. Further, a polar angle direction Pdr in the liquid crystal device according to the invention corresponds to the polar angle direction Pdr of the cellular phone 800. Hereinafter, the terms "inner surface" and "outer surface" are used. The term "inner surface" means a surface that is opposite a liquid crystal layer among various major surfaces of each substrate. In addition, "outer surface" means a surface that faces the opposite reverse side. Moreover, in the liquid crystal devices according to the invention, a second polarizing plate 31, a viewing angle control panel 20 (or 21), a display panel 10 (or 11), a first polarizing plate 30, an illuminating device 40, etc. are separately illustrated, but practically, these configuration elements are closely arranged.

First Embodiment

Configuration of Liquid Crystal Device

FIG. 2 is a sectional view schematically illustrating a configuration of a liquid crystal device 100 according to a first embodiment of the invention.

In the liquid crystal device 100 according to the first embodiment, a second polarizing plate 31, a viewing angle control panel 20, a display panel 10, a first polarizing plate 30, and an illuminating device 40 are subsequently arranged. Moreover, the liquid crystal device 100 includes a viewing angle control circuit 50 for controlling the viewing angle control panel 20.

The second polarizing plate 31, which carries out a function of generating linearly polarized light, includes a transmission axis 31*dr* (see FIGS. 3A, 3B, and 3C) for transmitting light vibration and an absorption axis for absorbing the light vibration in a direction perpendicular to the transmission axis 31*dr*. Similarly, the first polarizing plate 30 also includes a transmission axis 30*dr* (see FIGS. 3A, 3B, and 3C) and an absorption axis in a direction perpendicular to the transmission axis 30*dr*.

The display panel 10, which carries out a display function of displaying an image (display images) such as a character, a figure, or a photo, is a display panel of a wide viewing angle using a fringe field switching (FFS) mode which is an example of a transverse electric field mode. The display panel 10 includes an array substrate 9 and a color filter substrate 8 with a liquid crystal layer 6 interposed therebetween.

The array substrate 9 includes a first substrate main body 1, common electrodes 3 formed on the inner surface of the first substrate main body 1 so that a common potential is applied, an insulating layer 5 formed on the inner surfaces of the common electrodes 3, pectinate-shaped pixel electrodes 7 formed in every sub-pixel area SG that is a minimum unit of a display, alignment films (not shown) formed on the inner surface of the pixel electrodes 7 and the like. In addition, the color filter substrate 8 includes a second substrate main body 2, coloring layers 4R, 4G, and 4B formed in every sub-pixel area SG and formed of any one of red (R), green (G), and blue (B), and alignment films (not shown) formed on the inner surfaces of the coloring layers 4R, 4G, and 4B. Hereinafter, when indicating coloring layers irrespective of colors, they are simply described as the "coloring layers 4", but when distinguishing the color of a layer, for example, the "coloring layer 4R" is used.

In the display panel 10 with the above-described configuration, display areas corresponding to the sub-pixel areas SG of the three colors R, G, and B constitute one pixel area G. In the display panel 10, an electric field E in a transverse (slope) direction is generated between the common electrodes 3 and the pixel electrodes 7 when the display panel 10 is driven. At this time, liquid crystal alignment is controlled, and thus a desired color display image can be viewed from a viewing side.

The viewing angle control panel 20 carries out a function of controlling viewing angle of the display image displayed by the display panel 10. The viewing angle control panel 20 can switch a desired viewing angle display mode between a wide viewing angle display mode for gaining wide viewing angle characteristics and a narrow viewing angle display mode for gaining narrow viewing angle characteristics on the basis of viewing angle control signals output from the viewing angle control circuit 50. The viewing angle control panel 20 includes a first substrate 17 and a second substrate 18 arranged opposite the first substrate 17 with a liquid crystal layer 16 interposed therebetween. The liquid crystal layer 16 includes liquid crystal molecules 16a in which an initial alignment state is in a homogeneous direction. In this case, major axis directions (that is, a direction of the liquid crystal alignment axis of the viewing angle control panel 20) of the liquid crystal molecules 16a in the initial alignment state are a vertical direction (Y direction) of the liquid crystal device 100.

The first substrate 17 includes a first substrate main body 11 made of a light transmitting material such as glass or quartz, first electrodes 13 made of a transparent conductive material such as indium tin oxide (ITO) and formed on the inner surface of the first substrate main body 11, and a first alignment film 23 formed of a polyimide film for horizontal alignment on the inner surfaces of the first electrodes 13 so as to serves as alignment control means of the liquid crystal molecules 16a. In addition, the second substrate 18, which has the same configuration as the first substrate 17, includes a second substrate main body 12 made of a light-transmitting material such as glass or quartz, second electrodes 15 made of a transparent conductive material such as indium tin oxide (ITO) and formed on the inner surface of the second substrate main body 12, and a second alignment film 24 formed of a polyimide film for horizontal alignment on the inner surface of the second electrodes 15 so as to serves as alignment control means of the liquid crystal molecules 16a.

The viewing angle control circuit 50 outputs any viewing angle control signal of a wide viewing angle display mode control signal Sig_W for switching between the wide viewing angle display mode and a narrow viewing angle display mode control signal Sig_N for switching to the narrow viewing angle display mode depending on a viewing angle-switching operation of the cellular phone 800 by a user. In this case, the wide viewing angle display mode control signal Sig_W is a control signal for switching off the driving state of the liquid crystal layer 16 of the viewing angle control panel 20, that is, the control signal for allowing the viewing angle control panel 20 not to function. For example, the wide viewing angle display mode control signal Sig_W can be configured as a voltage non-applied signal (voltage of 0V) so that a voltage is not applied between the first electrodes 13 and the second electrodes 15. In addition, the narrow viewing angle display mode control signal Sig_N is a control signal for switching on the driving state of the liquid crystal layer of the viewing angle control panel 20, that is, the control signal for allowing the viewing angle control panel to function. For example, the narrow viewing angle display mode control signal Sig_N can be configured as a voltage applied signal so that a predetermined voltage is applied between the first electrodes 13 and the second electrode 15.

It is appropriate that the illuminating device 40 is a point-shaped light source such as a light-emitting diode (LED), a combination of a line-shaped light source such as a cold cathode fluorescent tube and a light guide plate, or the like. The illuminating device 40 irradiates illumination light L toward the viewing side of the display panel 10 and the viewing angle control panel 20.

Method of Setting Liquid Crystal Alignment Axis of Viewing Angle Control Panel, etc.

Figure 3A:
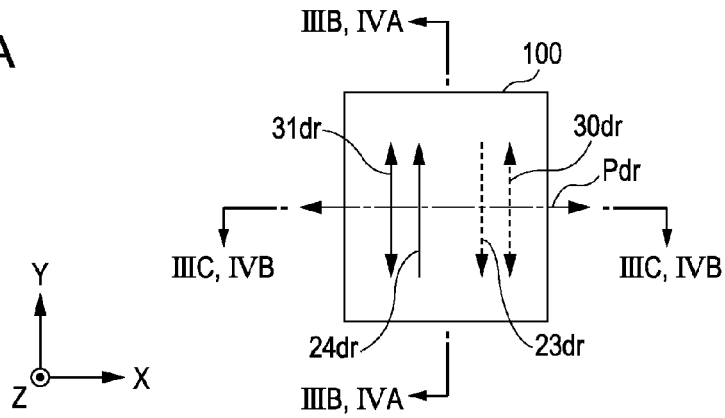
FIGS. 3A, 3B, and 3C are a top view and sectional views illustrated to describe a method of setting liquid crystal alignment axis of a viewing angle control panel and a method of controlling a wide viewing angle, and the like according to the first embodiment.
Figure 3B:
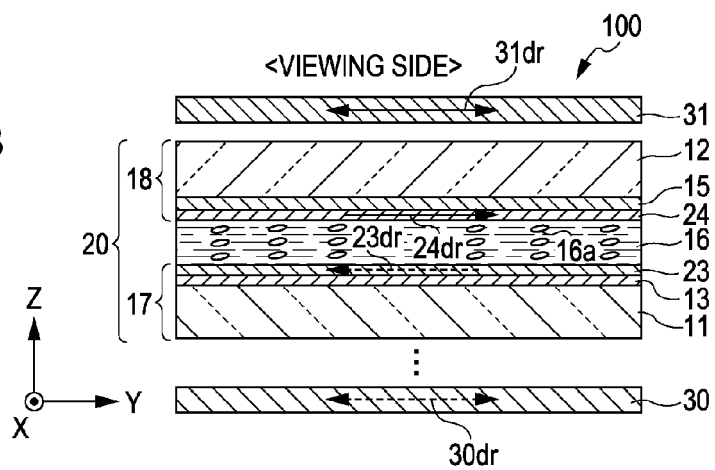
Figure 3C:
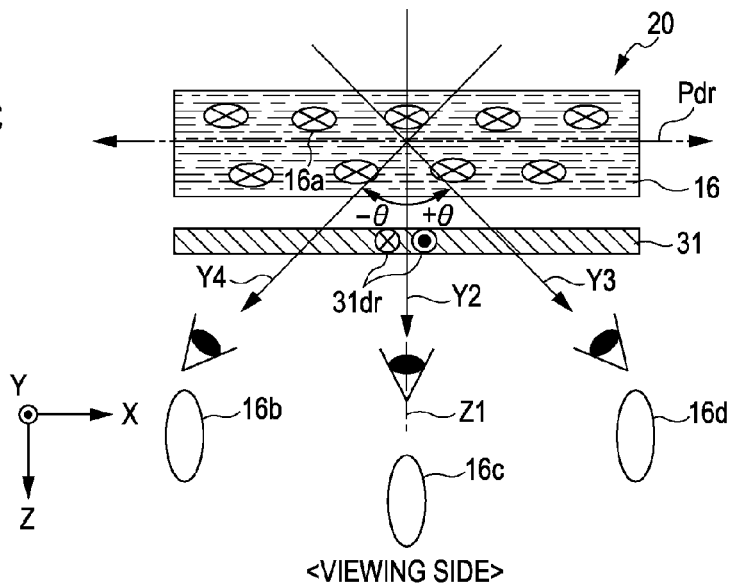

FIG. 3A is a schematic top view illustrating the liquid crystal device 100 disposed so that the horizontal direction (Y direction) in the liquid crystal device 100 is the vertical direction when the liquid crystal device 100 shown in FIG. 2 is viewed from the viewing side. In particular, FIG. 3A shows a relationship among a transmission axis 31dr (solid line) of the second polarizing plate 31, the liquid crystal alignment axis of the viewing angle control panel 20 disposed at a position adjacent to the second polarizing plate 31, and a transmission axis 30dr (dashed line) of the second polarizing plate 31. In this case, the "liquid crystal alignment axis" is a major axis direction (alignment direction) of each of the liquid crystal molecules 16a in the initial alignment state and includes rubbing directions of the first alignment film 23 and the second alignment film of the viewing angle control panel 20. FIG. 3B is a sectional view illustrating the liquid crystal device 100 taken along the line A-A' shown in FIG. 3A. FIG. 3C is a sectional view illustrating the viewing angle control panel 20 and the second polarizing plate 31 in the liquid crystal device 100 taken along the line B-B' shown in FIG. 3A. Moreover, necessary minimum elements are shown in FIGS. 3A, 3B, and 3C for convenience.

As shown in FIGS. 3A and 3B, the transmission axis 31dr of the second polarizing plate 31 and the transmission axis 30dr of the first polarizing plate 30dr are the vertical direction, which is substantially perpendicular to the polar angle direction Pdr (horizontal direction). In the viewing angle control panel 20, a rubbing direction 23dr (dashed line) of the first alignment film 23 and a rubbing direction 24dr (solid line) of the second alignment film 24 are substantially parallel to the transmission axis 31dr of the second polarizing plate 31 and the transmission axis 30dr of the first polarizing plate 30. In addition, the rubbing directions 23dr and 24dr are reverse directions of 180° with each other. In the initial alignment state, the liquid crystal molecules 16a are aligned parallel with the substrate surfaces of the first substrate 17 and the second substrate 18 and are aligned in the rubbing direction 23dr of the first alignment film 23 and the rubbing direction 24dr of the second alignment film 24. In this way, the major axis directions (alignment direction, that is, the liquid crystal alignment axis of the viewing angle control panel 20) of the liquid crystal molecules 16a are uniaxially aligned so as to be substantially parallel to the transmission 31dr of the second polarizing plate 31 and the transmission 30dr of the first polarizing plate 30. In the invention, the rubbing direction 23dr of the first alignment film 23 and the rubbing direction 24dr of the second alignment film 24 may be reverse directions shown in FIGS. 2A and 2B.

Principle of Viewing Angle Control

FIG. 3C shows a way of viewing the liquid crystal molecules 16a of the above-described state viewed by a user when viewing the viewing angle control panel 20 moving in the horizontal direction. When the liquid crystal molecules 16a are viewed from the front direction Y2 (normal line direction Z1), the shape of the liquid crystal molecules 16a looks like that of liquid crystal molecules 16c. The major axis direction of the liquid crystal molecule is the substantial same as a deflection direction of incident light. When an angle formed by the major axis directions of the liquid crystal molecules 16a of a projection view and the deflection direction of the incident light is 0°, the incident light is transmitted without an influence of birefringence. Accordingly, the display image of the display panel 10 is viewed. Moreover, even when the liquid crystal molecules 16a are viewed from the polar angle directions Pdr (the left inclination direction Y4 and the right inclination direction Y3) oblique by a predetermined angle ±θ° in the horizontal direction with respect to the front direction Y2 (the normal line direction Z1), as shown in FIG. 3C, the shape of the liquid crystal molecules 16a looks similar to that of the liquid crystal molecules 16b and 16d.

That is, the major axis direction is the substantial same as the deflection direction of the incident light. Accordingly, the display image of the display panel 10 is viewed. That is, the display image of the display panel 10 is viewed from any direction. At this time, a voltage non-applied state is configured as the wide viewing angle display mode.

Figure 4A:
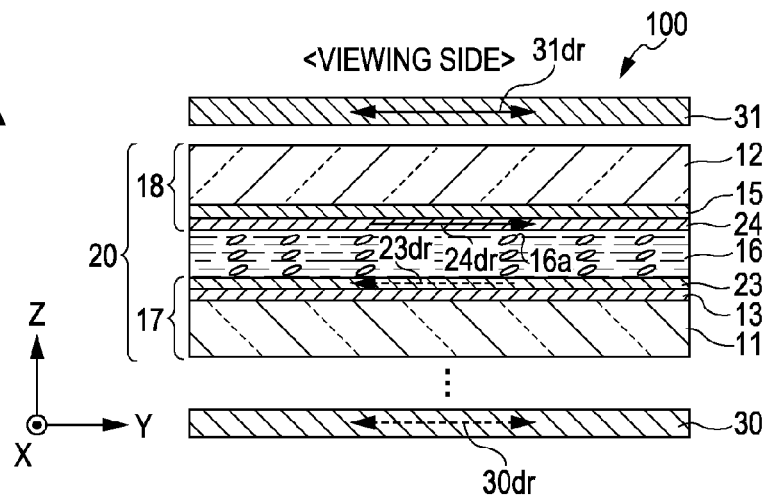
FIGS. 4A and 4B are sectional views illustrated to describe a narrow viewing angle control mode and the like according to the first embodiment.
Figure 4B:
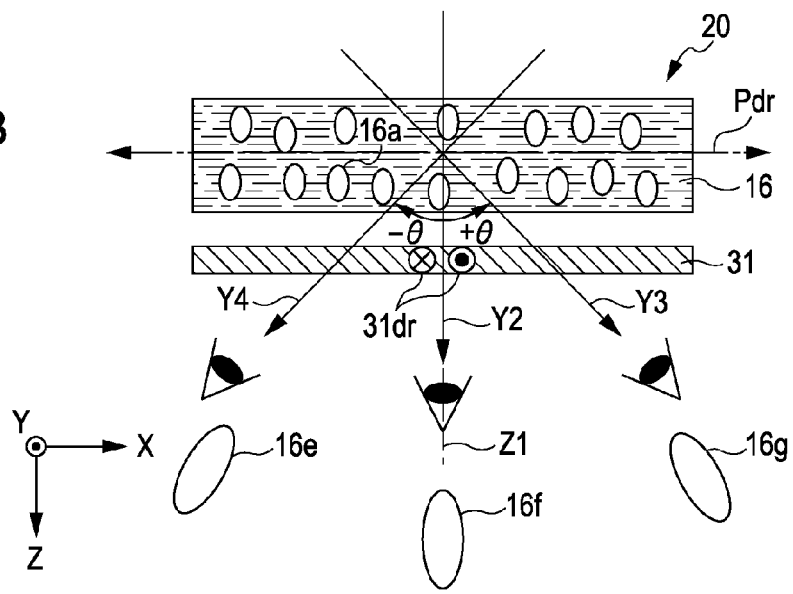

Alternatively, in the narrow viewing angle display mode, a predetermined voltage is applied between the first electrode 13 and the second electrode 15 from the voltage non-applied state so that the liquid crystal molecules 16a become oblique by a predetermined angle with respect to the substrate surfaces of the first substrate 17 and the second substrate 18 by rotation in the X direction. The alignment state of the liquid crystal molecules 16a at this time is shown in FIGS. 4A and 4B. FIG. 4A shows a sectional view of the liquid crystal device 100 corresponding to FIG. 3B. It is found that the liquid crystal molecules 16a are aligned obliquely by a predetermined angle with respect to the substrate surfaces of the first substrate 17 and the second substrate 18. FIG. 4B shows a sectional view including the viewing angle control panel 20 and the like corresponding to FIG. 3C. The liquid crystal molecules 16a are aligned oblique by a predetermined angle when viewed from the normal line direction (the Y direction).

As shown in FIG. 4B, a perspective view of the liquid crystal molecules 16a from the front direction Y2 (the normal line direction Z1) shows the liquid crystal molecules 16a looking like a liquid crystal molecule 16f. The alignment of the liquid crystal molecules 16a are changed depending on the rotation in the X direction. Accordingly, the transmission axis 31dr of the second polarizing plate 31 and the transmission axis 30dr of the first polarizing plate 30 are normally the same as the major axis direction of the liquid crystal molecule 16f. For this reason, when the liquid crystal device 100 is viewed from the front direction Y2, the display image of the display panel 10 is viewed without an influence of birefringence.

Alternatively, as shown in FIG. 4B, perspective views of the liquid crystal molecules 16a in which the liquid crystal molecules 16a are viewed from the polar angle direction Pdr (the left inclination direction Y4 and the right inclination direction Y3) oblique by a predetermined angle ±θ° in the horizontal direction with respect to the front direction Y2 (the normal line direction Z1) show the liquid crystal molecules 16a looking like liquid crystals 16e and 16g. In this case, since the transmission axis 31dr and the second polarizing plate 31 and the transmission axis 30dr of the first polarizing plate 30 form an angle with the major axis directions of the liquid crystal molecules 16e and 16f shown in FIG. 4B, a cross angle is formed between the major axis directions of the liquid crystal molecules 16e and 16g and the polarizing direction of the incident light. As a result, when viewed form the horizontal direction, the display image with a lowered contrast is viewed through the display panel 10 owing to the influence of birefringence.

On the above-described principle, when the liquid crystal device 100 according to the first embodiment is mounted on a position corresponding to the display unit 800b of the above-described cellular phone 800, the display image of the display panel 10 in the wide viewing angle display mode can be viewed without the influence of birefringence from any direction including the front direction Y2, the left inclination direction Y4, and the right inclination direction Y3 on the display unit 800b of the cellular phone 800 shown in FIG. 1B. Alternatively, when the display unit 800b is viewed from the directions (the left inclination direction Y4 and the right inclination direction Y3) other than the front direction Y2 in the narrow viewing angle display mode, the display image with the lowered contrast is viewed under the influence of birefringence through the display panel 10.

Figure 5:
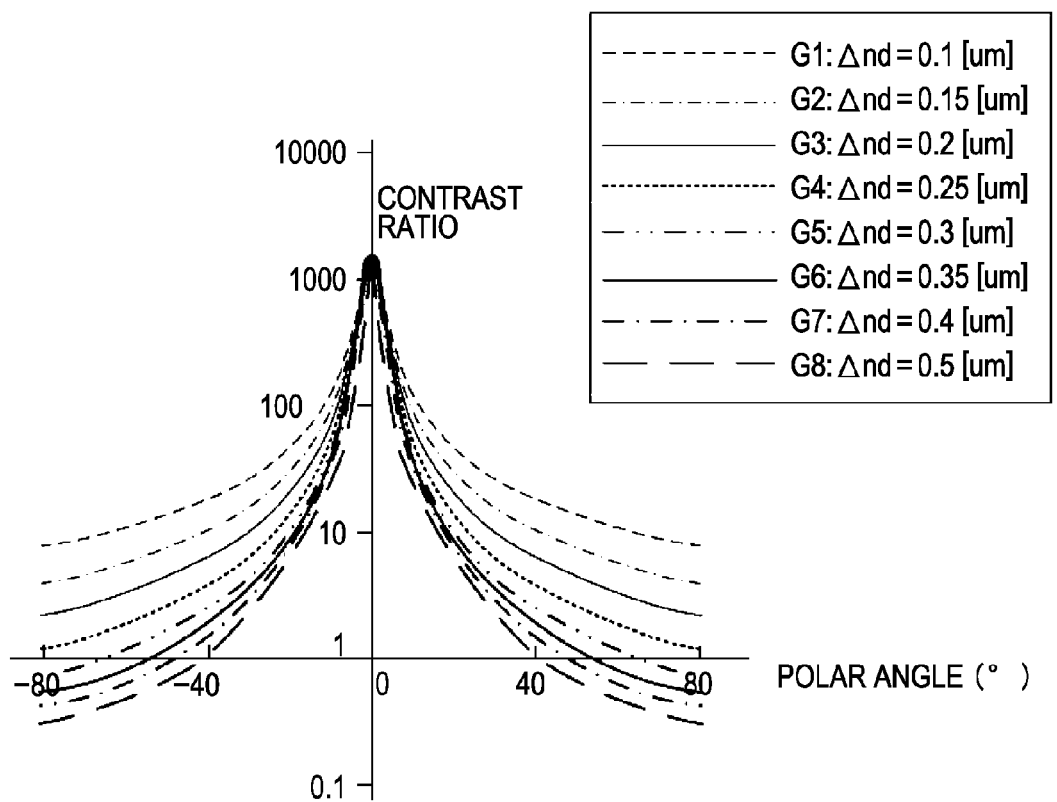
FIG. 5 is a graph illustrating and a relationship among retardations, contrast ratios, and polar angles when the retardations according to the first embodiment are changed.

Relationship Among Retardation, Contrast Ratio, Polar Angle of Viewing Control Panel FIG. 5 is a graph illustrating a relationship between contrast ratios and polar angles in the narrow viewing angle display mode in the viewing angle control panel 20 when products, retardations Δnd of refractive anisotropies Δn of liquid crystal and a cell thickness d of the viewing angle control panel 20 are appropriately changed. In FIG. 5, a vertical axis and a horizontal axis denote logarithm values of the contrast ratios and the polar angles, respectively. In this embodiment, the "cell thickness d" means a thickness of the liquid crystal layer 16 (or 16x) interposed between the first substrate 17 (or 17x) and the second substrate 18 (or 18x) in the viewing angle control panel 20 (or 21). In FIG. 5, graphs G1 to G8 show changes in which the retardations Δnd are changed from 1.0 μm to 4.5 μm in 0.5 μm increments.

when the absolute value 2 or less of the contrast ratio of the liquid crystal device 100 is an optimum designed value of the narrow viewing angle display mode in the absolute value of 40° or more of the polar angle, the retardation Δnd=about 0.25 μm to 0.4 μm (corresponding to the graphs G4 to G7) is optimum. In addition, it is found that the narrow viewing angle effect according to the invention can be achieved.

Example of Designed Value

Figure 6:
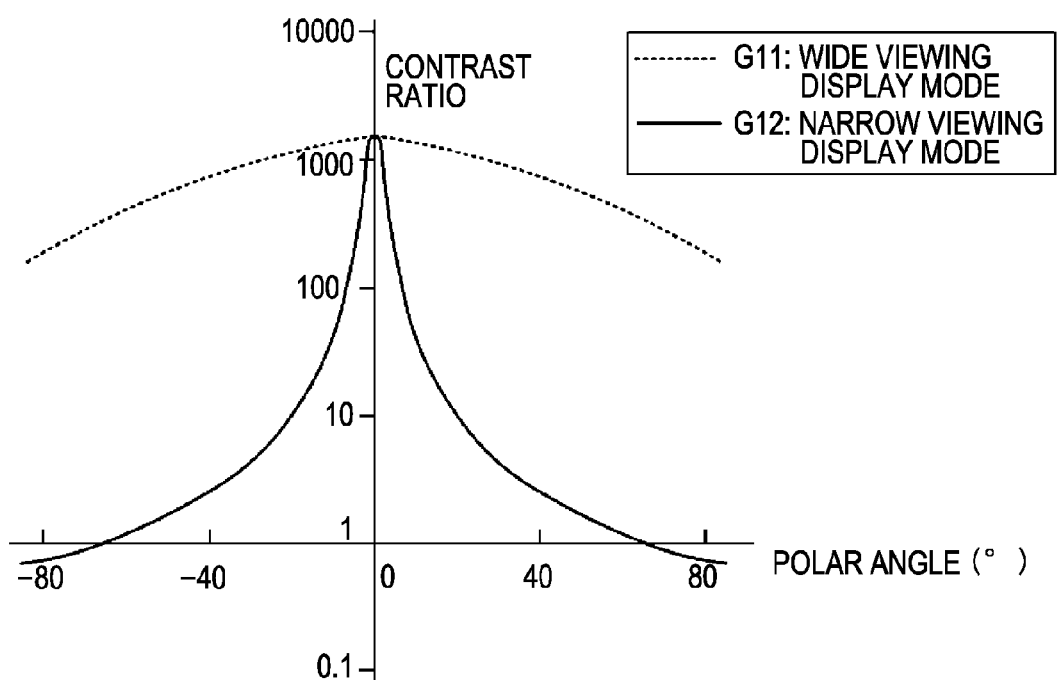
FIG. 6 is a graph illustrating the relationship among the retardations, the contrast ratios, and the polar angles as an example of a designed value according to the first embodiment.

FIG. 6 shows an example of the designed value according to the first embodiment in which the retardation Δnd of the viewing angle control panel 20 is set to about 0.3 μm and the retardation Δnd of the display panel 10 is set to 0.35 μm on the basis of the above-described result.

FIG. 6 is a graph illustrating a relationship between the logarithm values of the contrast ratios and the polar angles in the wide viewing angle display mode and the narrow viewing angle display mode of the viewing angle control panel 20 to which the example of the designed value according to the first embodiment is applied.

As shown in a graph G11 of the dashed line in the wide viewing angle display mode, it is found that even when the polar angles increase, the contrast ratios are rarely lowered and it is possible to gain wide viewing angle characteristics. Alternatively, as shown in a graph G12 of the solid line in the narrow viewing angle display mode, it is found that the contrast ratios are lowered as the polar angles increase. In particular, when the polar angles become about ±40°, the contrast ratios are 2 or less, and thus the contrast ratios are considerably lowered. Moreover, when the polar angles become about ±80°, the contrast ratios are lowered less than 1. Accordingly, it is found that the display image is rarely viewed.

Method of Controlling Viewing Angle of Viewing Angle Control Panel

In the first embodiment, when the wide viewing angle display mode is selected by a viewing angle switch operation of a user of the cellular phone 800, the viewing angle control circuit 50 outputs, for example, a voltage non-applied control signal between the first electrode 13 and the second electrode 15, that is, the wide viewing angle display mode Sig_W to the viewing angle control panel 20. Thus, since the viewing angle control panel 20 is set to the wide viewing angle display mode, it is possible to view a display image with a high contrast in the liquid crystal device 100, which graph 11 of FIG. 6 shows. Alternatively, when the narrow viewing angle display mode is selected by the viewing angle switch operation of user of the cellular phone 800, the viewing angle control circuit 50 outputs, for example, a voltage applied control signal between the first electrode 13 and the second electrode 15, that is, the narrow viewing angle display mode Sig_N to the viewing angle control panel 20. Thus, since the viewing angle control panel 20 is set to the narrow viewing angle display mode, the viewing angle of the above-described polar angle direction Pdr is limited to the narrower range. In particular, when the display unit 800b of the cellular phone 800 provided with the liquid crystal device 100 is viewed from the left inclination direction Y4 and the right inclination direction Y3, particularly from the direction of the polar angles of ±40° or more, as shown in FIG. 1B, FIG. 4B, and graph 12 of FIG. 6, the display image with the lowered contrast is viewed. As a result, it is possible to achieve the narrow viewing angle effect according to the invention. Moreover, in FIGS. 1A and 3A, the viewing angles in the vertical direction (the Y direction) of the cellular phone 800 and the liquid crystal device 100 are not limited.

Second Embodiment

Figure 7:
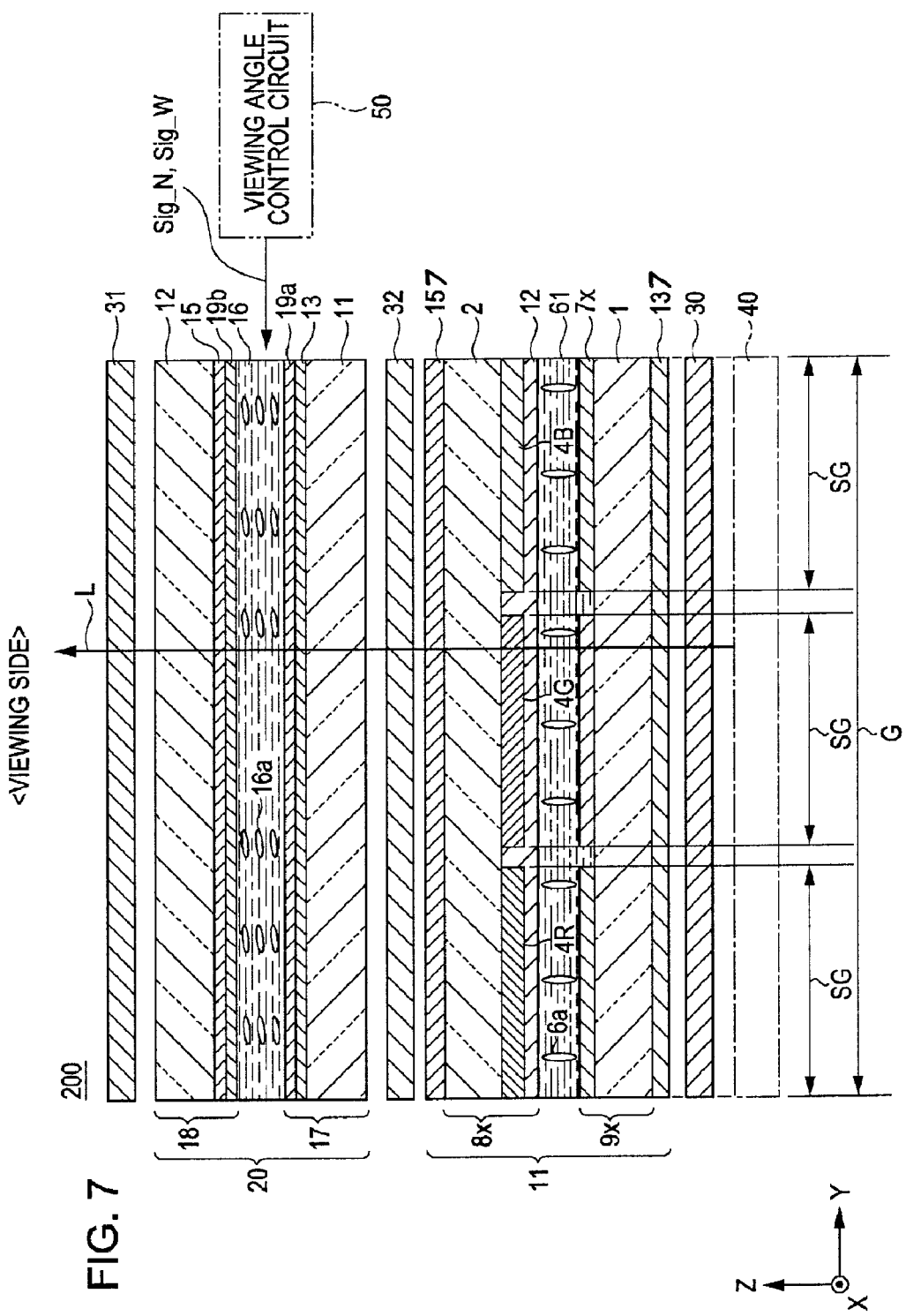
FIG. 7 is a sectional view illustrating a configuration of a liquid crystal device according to a second embodiment of the invention.

FIG. 7 is a schematically sectional view illustrating a liquid crystal device 200 according to a second embodiment of the invention.

When the second embodiment is compared to the first embodiment, a configuration of a display panel is different and others are the same. That is, the display panel 10 according to the first embodiment is of the fringe field switching (FFS) mode of the transverse electric field mode, but a display panel 11 according to the second embodiment is different in that the display panel 11 is a display panel of a circularly polarized light type emitting circularly polarized light toward the viewing angle control panel 20 and a display panel of a vertical alignment mode. In addition, the liquid crystal device 200 according to the second embodiment is different from that according to the first embodiment in that a phase difference film 32 for changing the circularly polarized light emitted from the display panel 11 to a viewing side to linearly polarized light is provided between the display panel 11 and the viewing angle control panel 20.

The configuration of the display panel 11 according to the second embodiment will be described with reference to FIG. 7. Hereinafter, the same reference numerals are given to the same constituents as those according to the first embodiment and the detailed description will be omitted.

The display panel 11, which is the display panel of the circularly polarized light mode and the vertical alignment mode, includes an array substrate 9x and a color filter substrate 8x with a liquid crystal layer 61 interposed therebetween. In addition, in the liquid crystal layer 61, dielectric anisotropy is negative.

The array substrate 9x includes a first substrate main body 1, pixel electrodes 7x formed on the inner surface of the first substrate main body 1 and in every sub-pixel area SG so that, for example, a plurality of polygonal or circular sub-pixel electrodes are formed in a shape of spitted dumpling, that is, so as to have so-called continuous pinwheel alignment (CPA) structure, and a first alignment film (not shown) made of a material such as a polyimide resin for vertical alignment and formed on the inner surface of the electrodes 7x or the like. In addition, the color filter substrate 8x includes a second substrate main body 2, coloring layers 4R, 4G, and 4B formed in the inner surface of the second substrate main body 2 and in every sub-pixel area SG, scanning electrodes 12 formed in the inner surfaces of the coloring layers 4R, 4G, and 4B in which a scanning signal is output from each driver IC (not shown), and a second alignment film (not shown) made of a material such as a polyimide resin for vertical alignment and formed on the inner surface of the scanning electrodes or the like. Moreover, in order to set a tilt direction of the liquid crystal molecules 16a that is vertically aligned at an initial alignment state, protrusions or slits made of a resin or the like may be formed in positions corresponding to the center of the sub-pixel electrodes. A first phase difference film 137 is disposed on the outer surface of the array substrate 9x and a second phase difference film 157 is disposed on the outer surface of the color filter substrate 8x. In this case, it is desirable that the pair of the first phase difference film 137 and the second phase difference film 157 have symmetrical phase characteristics across a visible wavelength range. Specifically, it is desirable that both retardation axes intersect with each other and the intersecting angle is set to be in the range of 90°±10°. For example, a phase difference film of λ/4 can be applied to the pair of the first phase difference film 137 and the second phase difference film 157.

In the display panel 11 with the above-described configuration, when a predetermined voltage is applied between the scanning electrode 12 and the pixel electrodes 7x at a driving time, the liquid crystal molecules 16a aligned substantially perpendicularly to the substrate surfaces of the array substrate 9x and the color filter substrate 8x in the initial alignment state are controlled to be radially tilted. In this case, illumination light L irradiated from an illuminating device 40 is converted into linearly polarized light vibrating in a transmission axis 30dr of the first polarizing plate 30 after passing through the first polarizing plate 30. Subsequently, the linearly polarized light is converted into the circularly polarized light after passing through the first phase difference film 137 and the second phase difference plate 157. Next, the circularly polarized light is converted into the linearly polarized light after passing through the phase difference film 32 provided between the display panel 11 and the viewing angle control panel 20, and then is incident into the viewing angle control panel 20 again. Finally, the linearly polarized light passing through the viewing angle control panel 20 is emitted to the viewing side through the second polarizing plate 31. As a result, a desired color display image is viewed.

Moreover, in the above description, the display panel of the circularly polarized light type and the vertical alignment type are used, but a display panel of the linearly polarized light type and the vertical alignment type may be also used. In this way, it is possible to allow the linearly polarized light to be incident from the display panel to the viewing angle control panel 20 without a supply of the phase difference film 32.

Example of Designed Value

Figure 8:
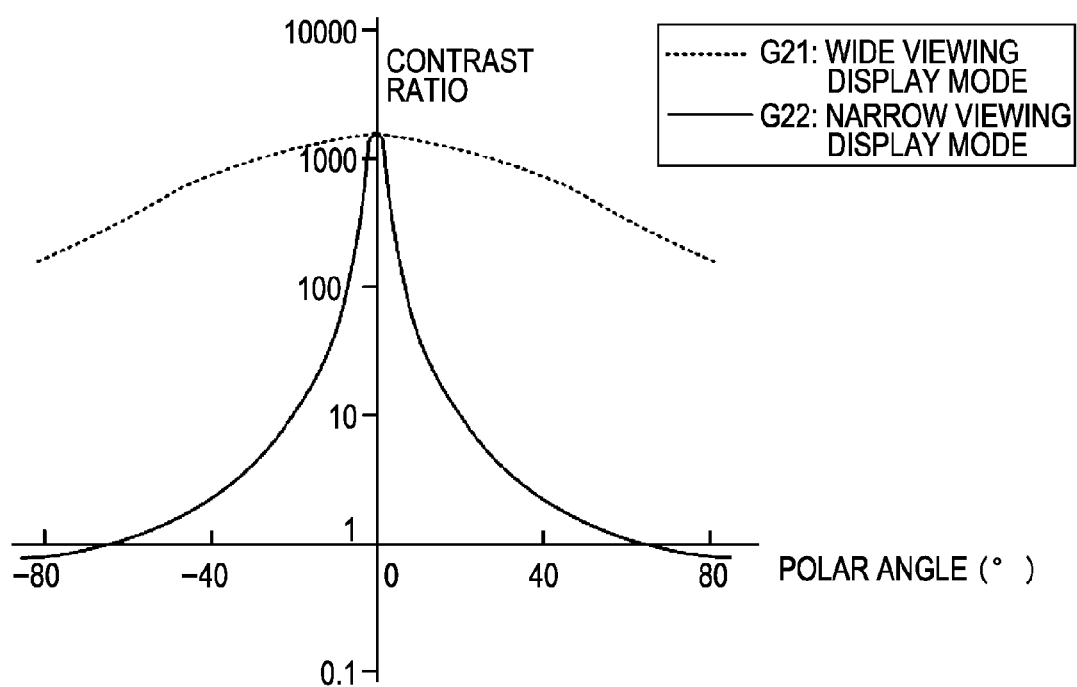
FIG. 8 is a graph illustrating the relationship among retardations, contrast ratios, and polar angles as an example of a designed value according to the second embodiment.

FIG. 8 shows an example of a designed value according to the second embodiment in which a retardation And of the viewing angle control panel 20 is set to be about 0.3 μm and a retardation And of the viewing angle control panel 11 is set to be about 0.42 μm.

FIG. 8 is a graph illustrating a relationship between contrast ratios and polar angles in the wide viewing angle display mode and the narrow viewing angle display mode of the viewing angle control panel 20 to which the example of the designed value according to the second embodiment is applied.

The graph shows the substantially same viewing angle characteristics according to the second embodiment as that according to the first embodiment. That is, in the wide viewing angle display mode, a dashed line graph G21 shows that the contrast ratios are rarely lowered even when the polar angles increase. Alternatively, in the narrow viewing angle display mode, a solid line graph G22 shows that the contrast ratios are lowered as the polar angles increase. In particular, when the polar angles become about ±40°, the contrast ratio is about 2 or less. Accordingly the contrast ratio is considerably lowered. Moreover, when the polar angles become about ±80°, the contrast ratio is lowered less than 1. Accordingly, it is found that the display image is rarely viewed.

Method of Controlling Viewing Angle of Viewing Angle Control Panel

In the first embodiment, like the above-described first embodiment, the viewing angle control circuit 50 outputs any viewing angle control signal between the wide viewing angle display mode control signal Sig_W for switching between the wide viewing angle display mode and the narrow viewing angle display mode control signal Sig_N for switching to the narrow viewing angle display mode to the viewing angle control panel 20 depending on the viewing angle switching operation of a user of the cellular phone 800 so as to carry out the viewing angle control.

Third Embodiment

Figure 9:
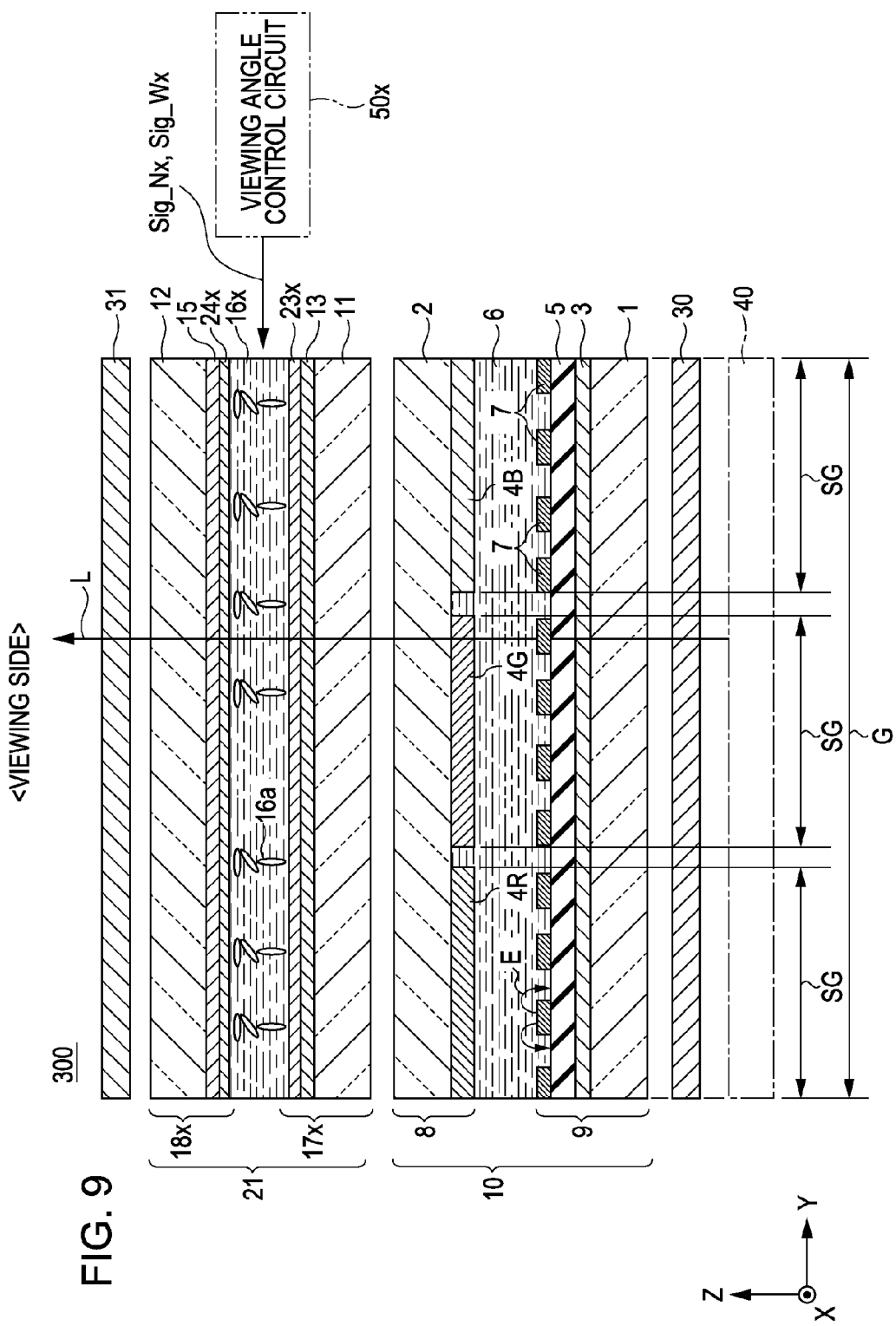
FIG. 9 is a sectional view illustrating a configuration of a liquid crystal device according to a third embodiment of the invention.

FIG. 9 is a schematically sectional view illustrating a liquid crystal device 300 according to a third embodiment of the invention.

When the third embodiment is compared to the first embodiment, a liquid crystal alignment state and a method of controlling viewing angles of a viewing angle control circuit in a viewing angle control panel are different and others are the same. Hereinafter, the same reference numerals are given to the same constituents as those according to the first embodiment and the detailed description will be omitted.

A viewing angle control panel 21 according to the third embodiment includes a first substrate 17x and a second substrate 18x with a liquid crystal layer 16x interposed therebetween. The liquid crystal layer 16x formed of a liquid crystal material in which dielectric anisotropy is negative is of a hybrid arrayed nematic (HAN) type in which hybrid alignment is formed. In this case, the "hybrid alignment" means an alignment state where a tilt angle of the liquid crystal molecule 16a continues to be changed from an interface of one substrate to an interface of the other substrate opposed thereto. Specifically, in the viewing angle control panel 21, the liquid crystal molecules 16a are aligned substantially parallel to the substrate surface in the second substrate 18x and are aligned substantially perpendicular to the substrate surface in the first substrate 17x. In addition, the liquid crystal molecules 16a in an initial alignment state can be gained, for example, by coating and baking a polyimide film (alignment film 24x) for horizontal alignment on the inner surface of a second electrodes 15 of the second substrate 18x so as to perform a rubbing treatment and by coating and baking a polyimide film (alignment film 23x) for vertical alignment on the inner surface of a first electrodes 13 of the first substrate 17x.

In the third embodiment, the viewing angle control circuit 50x outputs any viewing angle control signal between the wide viewing angle display mode control signal Sig_Wx for switching between the wide viewing angle display mode and the narrow viewing angle display mode control signal Sig_Nw for switching to the narrow viewing angle display mode to the viewing angle control panel 20 depending on the viewing angle switching operation of a user of the cellular phone 800. In this case, the wide viewing angle display mode control signal Sig_Wx is a control signal for allowing the driving state of the liquid crystal molecules 16x of the viewing angle control panel 20 not to switch off, that is, for allowing the viewing angle control panel 20 not to function. For example, the control signal can be configured to apply a voltage between the first electrodes 13 and the second electrodes 15. Alternatively, the narrow viewing angle display mode control signal Sig_Nx is a control signal for allowing the driving state of the liquid crystal molecules 16x of the viewing angle control panel 20 not to switch on, that is, for allowing the viewing angle control panel 20 to function. For example, the control signal can be configured not to apply a voltage (voltage of 0 V) between the first electrodes 13 and the second electrodes 15.

Method of Setting Liquid Crystal Alignment Axis of Viewing Angle Control Panel, etc.

In the liquid crystal device 300 according to the third embodiment, a relationship among the transmission axis 31dr of the second polarizing plate 31, a liquid crystal alignment axis of the viewing angle control panel 21 disposed at a position adjacent to the second polarizing plate 31, and the transmission axis 30dr of the first polarizing plate 30 is the substantial same in the liquid crystal device 100 according to the first embodiment. The description is omitted.

Principle of Viewing Angle Control

The liquid crystal device 300 according to the third embodiment has the viewing angle control panel 21 having the liquid crystal layer 16x which is in the hybrid alignment. Accordingly, when a non-selection voltage is applied (voltage off), the viewing angles of the display panel 10 is narrowed, thereby achieving a viewing angle limit effect. The operation will be described below.

Figure 10A:
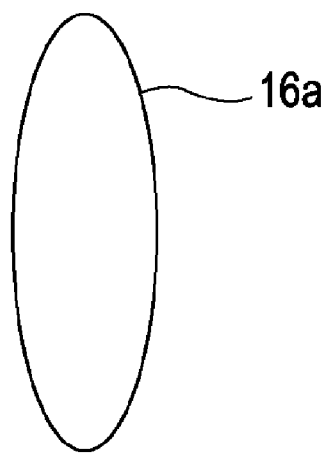
FIGS. 10A and 10B are diagrams illustrated to describe a principle of a viewing angle control according to the third embodiment.
Figure 10B:
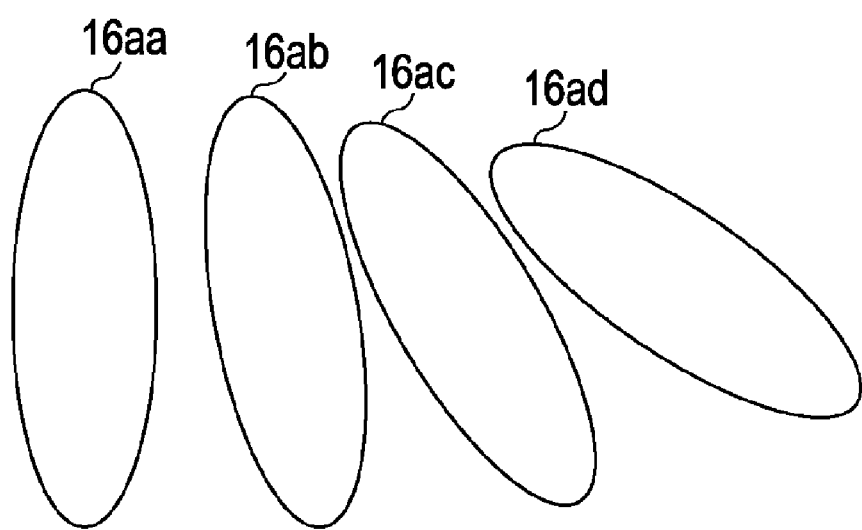

For example, in the light axes arrangement shown in FIG. 3A, when the liquid crystal layer 16x of the hybrid alignment is viewed from the normal line direction (the Z direction) of the viewing angle control panel 21, the figure shown in FIG. 10A is viewed. That is, the major axis directions of the liquid crystal molecules 16a is viewed just as they are overlapped on the straight line from the upper portion to lower portion of the liquid crystal layer 16x. In addition, when the liquid crystal layer 16x of the hybrid alignment is viewed obliquely from the right side with respect to the normal line direction, the figure shown in FIG. 19B is viewed. That is, the major axis directions of the liquid crystal molecules 16aa to 16ad are viewed just as the liquid crystal molecule 16aa in the upper portion of the liquid crystal layer 16x (side of the second substrate 18x) to the liquid crystal molecule 16 ad in the lower portion thereof (side of the first substrate 17x) are twisted from the vertical direction to the horizontal direction. That means that the liquid crystal layer 16x is aligned so as to be twisted by a predetermined angle on the outside in terms of light that is incident obliquely from a right side or left side with respect to the normal line direction of the viewing angle control panel 21. That is, since an optical activity occurs in the obliquely incident light, the linearly polarized light emitted from the illuminating device 40 and passing through the first polarizing plate 30 is optically activated in the viewing angle control panel 21 through the display panel 10 and is absorbed by an absorption axis of the second polarizing plate 31. As a result, in FIG. 1B and so on, when the display unit 800b of the cellular phone 800 with the liquid crystal device 300 is viewed from the right and left inclination directions (arrows Y3 and Y4) with respect to the front direction Y2 (the normal line direction Z1), the display image with the lowered contrast is viewed. However, when viewed from the front direction Y2, the optical activity does not occur, thereby viewing the display image with the high contrast.

When the selection voltage is applied (voltage on), the hybrid alignment is broken. Accordingly, since a liquid crystal material in which the dielectric anisotropy is negative is used in the liquid crystal layer 16x, all the liquid crystal molecules 16a fall down substantially horizontally with respect to the substrate surfaces of the first substrate 17x and the second substrate 18x. At this time, there is no optical activity in the light not only in the normal line direction Z1 of the viewing angle control panel 21, but also in the incident light coming obliquely from the right side or the left side. As a result, even when the display unit 800b of the cellular phone 800 with the liquid crystal device 300 in FIG. 1B and so on is viewed from any direction, the display image with the high contrast can be viewed.

Figure 11:
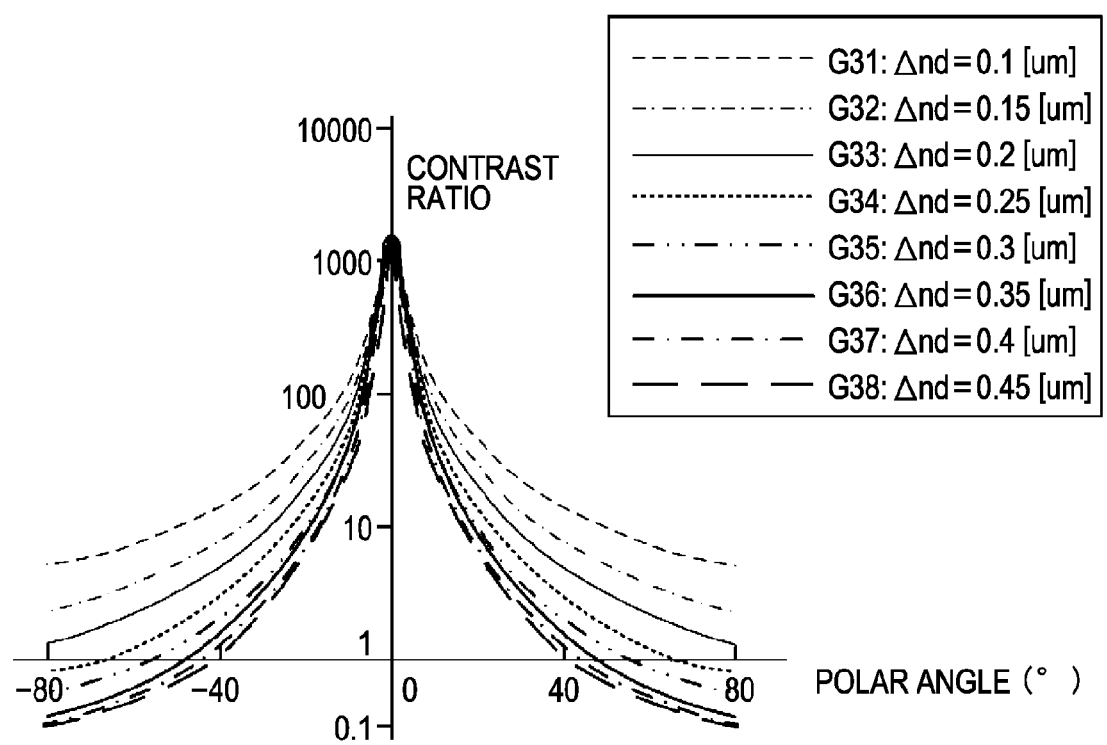
FIG. 11 is a graph illustrating and a relationship among retardations, contrast ratios, and polar angles when the retardations according to the third embodiment are changed.

Relationship Among Retardation, Contrast Ratio, Polar Angle of Viewing Control Panel FIG. 11 is a graph illustrating a relationship between the contrast ratios and the polar angles in the narrow viewing angle display mode in the viewing angle control panel 21 when products, retardations Δnd of refractive anisotropies Δn of liquid crystal and a cell thickness d of the viewing angle control panel 21 are appropriately changed. In FIG. 11, graphs G31 to G38 show changes in which the retardations Δnd are changed from 1.0 μm to 4.5 μm in 0.5 μm increments.

When the absolute values 2 or less of the contrast ratio of the liquid crystal device 300 are optimum designed values of the narrow viewing angle display mode in the absolute value of 40° or more of the polar angle, the retardations Δnd=about 0.2 μm to 0.3 μm (corresponding to the graphs G33 to G35) are optimum. In addition, it is found that the narrow viewing angle effect according to the invention can be achieved.

Example of Designed Value

Figure 12:
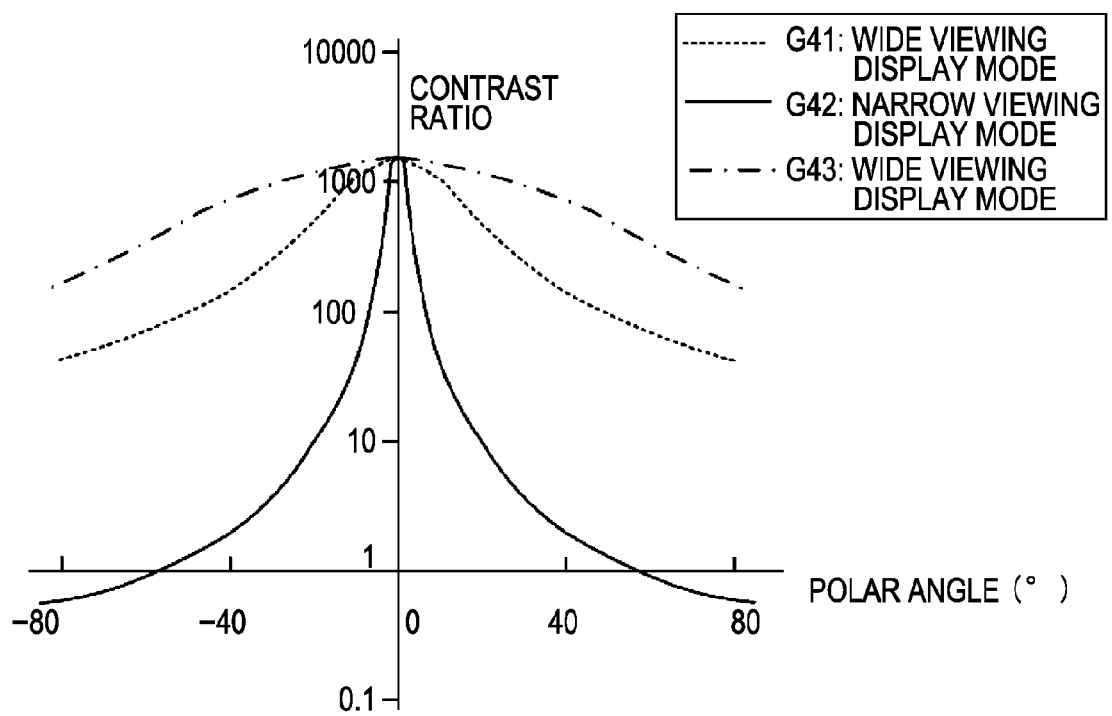
FIG. 12 is a graph illustrating the relationship among the retardations, the contrast ratios, and the polar angles as an example of a designed value according to the third embodiment.

FIG. 12 shows an example of the designed value according to the third embodiment in which the retardation Δnd of the viewing angle control panel 21 is set to about 0.25 μm and the retardation Δnd of the display panel 10 is set to 0.35 μm on the basis of the above-described result.

FIG. 12 is a graph illustrating a relationship between the logarithm values of the contrast ratios and the polar angles in the wide viewing angle display mode and the narrow viewing angle display mode of the viewing angle control panel 21 to which the example of the designed value according to the third embodiment is applied.

As shown in a graph G41 of the dashed line in the wide viewing angle display mode among the above graphs, it is found that even when the polar angles increase, the contrast ratios are rarely lowered and it is possible to gain wide viewing angle characteristics. However, in this case, when compared to the designed value according to the first embodiment, the wide viewing angle characteristics of the wide viewing angle display mode is likely to be lowered a little as the polar angle increases.

The reason is as follows. That is, the viewing angle control panel 21 has the liquid crystal layer 16x in which the liquid crystal molecules 16a have the hybrid alignment in the initial state. Accordingly, when a predetermined voltage is applied between the first electrodes 13 and the second electrodes 15, the liquid crystal molecules 16a are aligned substantially homogeneously. However, since the liquid crystal molecules 16a aligned vertically with respect to the substrate surface of the first substrate 17 exist somewhat, all the liquid crystal molecules 16a are not entirely aligned homogeneously. As a result, when compared to the first embodiment, the viewing angle characteristics in the wide viewing angle display mode is likely to be lowered a little as the polar angle increases.

In order to gain the wide viewing angle characteristics according to the first embodiment, it is desirable that, for example, the phase difference film (not shown) for compensating viewing angle characteristics between the viewing angle control panel 21 and the second polarizing plate 31. However, in order to carry out a narrow viewing angle control, the phase difference film is required to have the following characteristics. For example, the light emitted from the viewing side to the first polarizing plate 30 is converted into the linearly polarized light after passing through the second polarizing plate 31. However, it is required that the phase difference film be capable of emitting the linearly polarized light into the viewing angle control panel 21. Alternatively, even though the phase difference film has a phase difference in the surface, the phase difference film may be substantially parallel or perpendicular to the transmission axis 31dr of the second polarizing plate 31. At this time, since the linearly polarized light can be incident into the viewing angle control panel 21 without a change of the linearly polarized light, such a phase difference film meets the above-described requirement. In this way, in the wide viewing angle display mode, it is possible to gain the wide viewing angle characteristics shown in a graph G43.

Alternatively, in the narrow viewing angle display mode, as the polar angle increases, the lowered contrast ratio can be found in a solid line graph G42. In particular, when the polar angles become about ±40°, the contrast ratios are 2 or less, and thus the contrast ratios are considerably lowered. Moreover, when the polar angles become about ±80°, the contrast ratios are lowered less than 1. Accordingly, it is found that the display image is rarely viewed.

Method of Controlling Viewing Angle of Viewing Angle Control Panel

In the third embodiment, like the above-described first embodiment, the viewing angle control circuit 50x outputs any viewing angle control signal between the wide viewing angle display mode control signal Sig_Wx for switching between the wide viewing angle display mode and the narrow viewing angle display mode control signal Sig_Nx for switching to the narrow viewing angle display mode to the viewing angle control panel 22 depending on the viewing angle switching operation of a user of the cellular phone 800 so as to carry out the viewing angle control.

MODIFIED EXAMPLE

In the above-described embodiments, the liquid alignment axis of the viewing angle control panel 20 disposed at a position adjacent to the transmission axis 31dr of the second polarizing plate 31 and the second polarizing plate 31 is substantially parallel to the transmission axis 30dr of the first polarizing plate 30. However, in the invention, the light reaching the viewing angle control panel 20 (or 21) through the second polarizing plate 31 may be substantially linearly polarized. In addition, the direction of the liquid crystal alignment axis of the viewing angle control panel 20 (or 21) may be substantially parallel or perpendicular to the linearly polarized light.

For example, as the example, a modified example will be described with reference to FIGS. 13 and 14. That is, in the modified example, the transmission axis 31dr of the second polarized plate 31 is substantially parallel to the transmission axis 30dr of the first polarizing plate 30. Simultaneously, the transmission axis 31dr of the second polarizing plate 31 and the transmission axis 30dr of the first polarizing plate 30 are substantially perpendicular to the liquid crystal alignment axis of the viewing angle control panel 20 disposed at a position adjacent to the second polarizing plate 31. Moreover, when a liquid crystal device 400 described below according to the modified example is compared to the liquid crystal device 100 according to the first embodiment, the directions of the transmission axis 30dr of the first polarizing plate 30 and the transmission axis 31dr of the second polarizing plate 31 are different from each other, but others are the same.

Figure 13A:
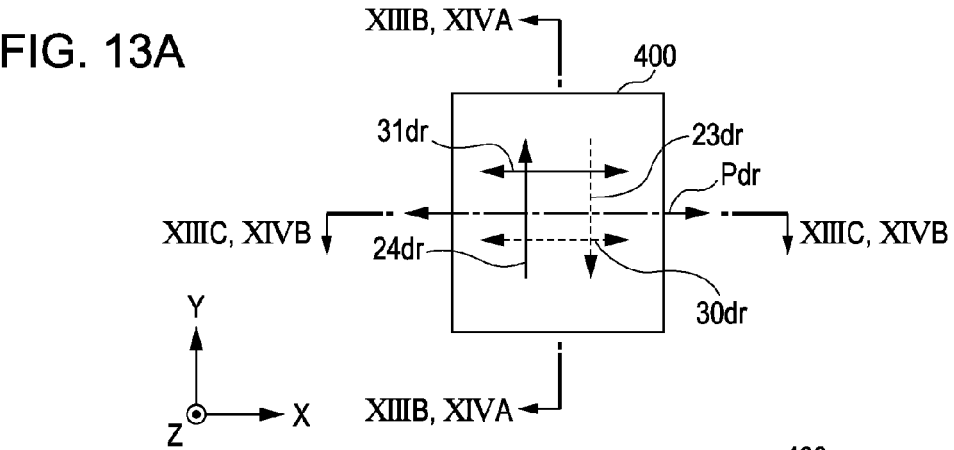
FIGS. 13A, 13B, and 13C are a top view and sectional views illustrated to describe a method of setting liquid crystal alignment axis of a viewing angle control panel and a method of controlling a wide viewing angle, and the like according to the modified example.
Figure 13B:
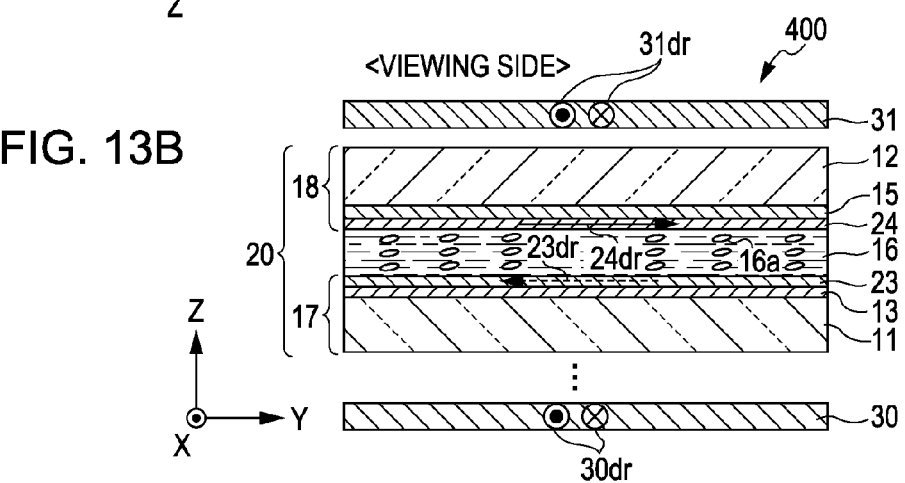
Figure 13C:
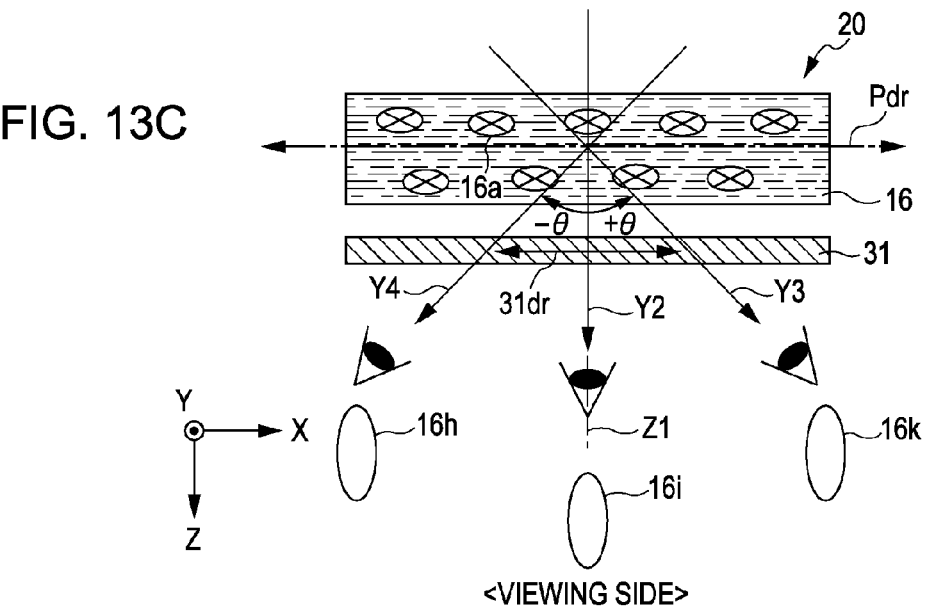

Method of Setting Liquid Crystal Alignment Axis of Viewing Angle Control Panel, etc. According to Modified Example FIG. 13A is a schematic top view illustrating the liquid crystal device 400 in correspondence with FIG. 3A and particularly shows a relationship among the transmission axis 31dr (solid line) of the second polarizing plate 31, the liquid crystal alignment axis of the viewing angle control panel 20, and the transmission axis 30dr (dashed line) of the first polarizing plate 30. FIG. 13B is a sectional view illustrating the liquid crystal device 400 taken along the line A-A' shown in FIG. 13A. FIG. 13C is a sectional view illustrating the viewing angle control panel 20 and the second polarizing plate 31 in the liquid crystal device 400 taken along the line B-B' shown in FIG. 13A. Moreover, FIGS. 13A, 13B, and 13C show minimum constituents for convenience.

In the liquid crystal device 400, as shown in FIGS. 13A and 13B, the transmission axis 31dr of the second polarizing plate 31 and the transmission axis 30dr of the first polarizing plate 30 are in the horizontal direction substantially parallel to the polar angle direction Pdr (the horizontal direction). In the viewing angle control panel 20, a rubbing direction 23dr (dashed line) of the first alignment film 23 and a rubbing direction 24dr (solid line) of the second alignment film 24 are substantially parallel to the transmission axis 31dr of the second polarizing plate 31 and the transmission axis 30dr of the first polarizing plate 30. In addition, the rubbing directions 23dr and 24dr are reverse directions of 180° each other. In the initial alignment state, the liquid crystal molecules 16a are aligned parallel with the substrate surfaces of the first substrate 17 and the second substrate 18 and are aligned along the rubbing direction 23dr of the first alignment film 23 and the rubbing direction 24dr of the second alignment film 24. In this way, the major axis directions (alignment direction, that is, the liquid crystal alignment axis of the viewing angle control panel 20) of the liquid crystal molecules 16a are uniaxially aligned so as to be substantially parallel to the transmission 31dr of the second polarizing plate 31dr and the transmission 30dr of the first polarizing plate 30.

Principle of Viewing Angle Control

FIG. 13C shows a way of viewing the liquid crystal molecules 16a of the above-described state viewed by a user when viewing the viewing angle control panel 20 moving in the horizontal direction. When the liquid crystal molecules 16a are viewed from the front direction Y2 (normal line direction Z1), the shape of the liquid crystal molecules 16a looks similar to that of the liquid crystal molecules 16i. The major axis direction of the liquid crystal molecule is perpendicular to a deflection direction of incident light. When an angle formed by the major axis directions of the liquid crystal molecules 16a of a projection view and the deflection direction of the incident light is 90°, the incident light is transmitted without an influence of birefringence. Accordingly, the display image of the display panel 10 is viewed. Moreover, even when the liquid crystal molecules 16a are viewed from the polar angle directions Pdr (the left inclination direction Y4 and the right inclination direction Y3) oblique by a predetermined angle ±θ° in the horizontal direction with respect to the front direction Y2 (the normal line direction Z1), as shown in FIG. 13C, the shape of the liquid crystal molecules 16a looks similar to that of liquid crystal molecules 16h and 16k. Accordingly, the display panel 10 is viewed. That is, the display image of the display panel 10 is viewed from any direction. At this time, a voltage non-applied state is configured as the wide viewing angle display mode.

Figure 14A:
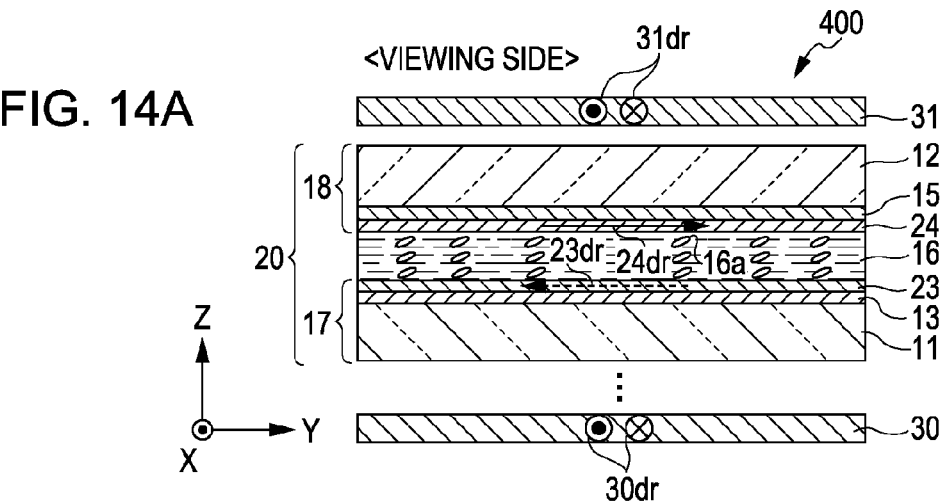
FIGS. 14A and 14B are sectional views illustrated to describe a narrow viewing angle control mode and the like according to the modified example.
Figure 14B:
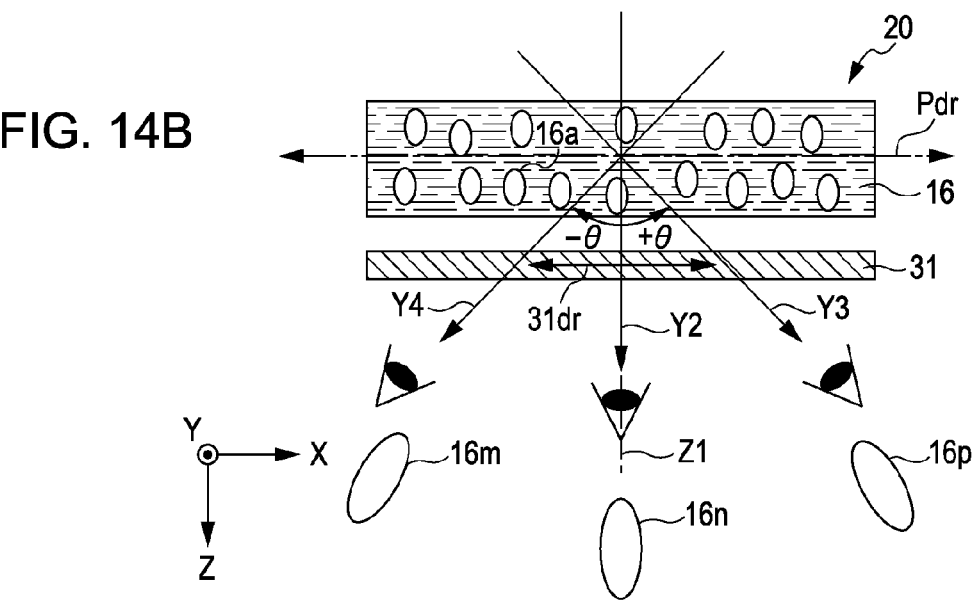

Alternatively, in the narrow viewing angle display mode, a predetermined voltage is applied between the first electrode 13 and the second electrode 15 from the voltage non-applied state so that the liquid crystal molecules 16a become oblique by a predetermined angle with respect to the substrate surfaces of the first substrate 17 and the second substrate 18 by rotation on the X direction. The alignment state of the liquid crystal molecules 16a at this time is shown in FIGS. 14A and 14B. FIG. 14A shows a sectional view of the liquid crystal device 400 corresponding to FIG. 4A. It is found that the liquid crystal molecules 16a are aligned oblique by a predetermined angle with respect to the substrate surfaces of the first substrate 17 and the second substrate 18. FIG. 14B shows a sectional view including the viewing angle control panel 20 and the like corresponding to FIG. 4B. The liquid crystal molecules 16a are aligned oblique by a predetermined angle when viewed from the normal line direction (the Y direction).

As shown in FIG. 14B, a perspective view of the liquid crystal molecules 16a from the front direction Y2 (the normal line direction Z1) shows the liquid crystal molecules 16a looking like a liquid crystal molecule 16n. The alignment of the liquid crystal molecules 16a are changed depending on the rotation on the X direction. Accordingly, the transmission axis 31dr of the second polarizing plate 31 and the transmission axis 30dr of the first polarizing plate are perpendicular to the major axis direction of the liquid crystal molecule 16f. For this reason, when the liquid crystal device 400 is viewed from the front direction Y2, the display image of the display panel 10 is viewed without an influence of birefringence.

Alternatively, as shown in FIG. 14B, perspective views of the liquid crystal molecules 16a in which the liquid crystal molecules 16a are viewed from the polar angle directions Pdr (the left inclination direction Y4 and the right inclination direction Y3) oblique by predetermined angle ±θ° in the horizontal direction show the liquid crystal molecules 16a looking like liquid crystals 16m and 16p. In this case, since the transmission axis 31dr and the second polarizing plate 31 and the transmission axis 30dr of the first polarizing plate 30 form an angle with the major axis directions of the liquid crystal molecules 16m and 16p shown in FIG. 4B, a cross angle is formed between the major axis directions of the liquid crystal molecules 16m and 16p and the polarizing direction of the incident light. As a result, when viewed form the horizontal direction, the display image with a lowered contrast is viewed through the display panel 10 owing to the influence of birefringence.

On the above-described principle, when the liquid crystal device 400 according to the modified example is mounted on a position corresponding to the display unit 800b of the above-described cellular phone 800, the display image of the display panel 10 in the wide viewing angle display mode can be viewed without the influence of birefringence from any direction including the front direction Y2, the left inclination direction Y4, and the right inclination direction Y3 on the display unit 800b of the cellular phone 800 shown in FIG. 1B. Alternatively, when the display unit 800b is viewed from the directions (the left inclination direction Y4 and the right inclination direction Y3) other than the front direction Y2 in the narrow viewing angle display mode, the display image with the lowered contrast is viewed under the influence of birefringence through the display panel 10.

Of course, the ways configuring the liquid crystal alignment axis of the viewing angle control panel according to the modified example may be applied to the liquid crystal devices 200 and 300 according to the second and third embodiments of the invention, respectively.

In the above-described embodiments, it is described that the display panels 10 and 11 of the projection type are used. However, the display panels of a reflective type and a transflective type may be applied to the invention. In this case, it is desirable that the second polarizing plate 31, the viewing angle control panel (or 21), the display panels of the reflective type and the transflective type, the first polarizing plate 30, and the illuminating device 40 are subsequently arranged. That is, it is desirable that the viewing angle control panel 20 (or 21) is configured to be disposed at a position of the viewing side rather than the display panels of the reflective type and the transflective type. Accordingly, even in the display of the reflective type, it is possible to carry out the viewing control according to the invention. Moreover, in this case, it is possible to obtain a bright display image.

In the invention, the display panel is not limited to the above-described configuration examples, but the various known configurations may be employed.

In the invention, only one viewing angle control panel is provided to the liquid crystal device. In addition, in FIG. 1B and so on, the viewing angle is controlled so that the contrast of the display image viewed from the left inclination direction Y4 and the right inclination direction Y3 oblique by ±θ in the horizontal direction with respect to the front direction Y2 (the normal line direction Z1) of the liquid crystal device disposed at the position corresponding to the display unit 800b of the cellular phone 800. Moreover, in the invention, another viewing angle control panel is provided and one viewing angle control panel and the other viewing angle control panel are closely arranged with each other. At this time, the liquid crystal alignment axis of the one viewing angle control panel may be substantially perpendicular to that of the other viewing angle control panel. Alternatively, the liquid crystal alignment axis of the one viewing angle control panel and the other viewing angle control panel may form a predetermined cross angle (for example, the cross angles in the range of 90°±10°). In this way, in the display unit 800b of the cellular phone 800 shown in FIG. 1A, it is possible to limit the viewing angle in the horizontal and vertical directions.

In the above-described embodiments, the viewing angle panels are configured to have the liquid crystal layers having the homogeneous alignment or the hybrid alignment. In the invention, however, it is not limited thereto, but the viewing angle panel may be configured to have a liquid crystal layer having bend alignment or a liquid crystal having twisted alignment of about 180°. In this case, the viewing angle control effect according to the invention can be achieved.

The display panels according to the first and the third embodiments, as the example of the transverse electric field mode, the FFS type is applied. However, it is not limited thereto, but another transverse electric field mode such as an in-plane switching (IPS) type or the like may be employed in the display panel according to the invention. Moreover, when the display panel with such a transverse electric field mode is employed, the viewing angle control panel is disposed at another substrate with no electrode such as the color filter substrate, but not the array substrate having the electrodes like the configuration example according to the first and third embodiments. That is why the electrodes for driving the liquid crystal are formed only in the array substrate among the pair of the substrate interposing the liquid crystal layer, and thus such a transverse electric field mode has a weak configuration with respect to state electricity. For this reason, in order to solve this problem, in this display panel, a protective film of the static electricity made of ITO and the like is generally formed on an entire surface of the exterior substrate (opposite side of the liquid crystal layer) of the other substrate opposite the array substrate. Moreover, the potential of the protective film of the static electricity is changed to that of GND (ground). However, like the liquid crystal device, when the viewing angle control panel is disposed at the surface of the exterior substrate (opposite side of the liquid crystal layer) having no electrode, it is possible to carry out the same function of protective film of the static electricity without a supply of such a protective film of the static electricity.

Suppose that user view the display image wearing polarizing glasses such as polarizing sunglasses. According to the above-described first to third embodiments, the phase difference film for viewing a display image may be configured to be provided in the outer side (opposite side of the transverse section of the viewing angle control panel) of the second polarizing plate 31 placed in the viewing side without lowering a brightness for the user wearing the polarizing glasses. Moreover, the phase difference film carries out a function of concord a polarized light direction of light with the transmission axis of the polarizing glasses and allows the light emitted from the phase difference plate to the viewing side to be incident into the polarizing glasses. Accordingly, the light can be emitted to eyes of the user without lowering the brightness of the light.

In the invention, one or the plurality of phase difference films may be provided in the liquid crystal device according to the invention, if necessary, so as to meet the requirement of the relationship where the transmission 31dr of the second polarizing plate 31 is substantially parallel or perpendicular to the liquid crystal alignment axis of the viewing angle control panel adjacent thereto.

As an example of an electronic apparatus capable of applying the liquid crystal device according to the invention, the cellular phone 800 is described. However, it is not limited thereto, but the electronic apparatuses capable of applying the liquid crystal device according to the invention include a mobile type of a personal computer (so-called laptop computer), a liquid crystal TV, a view finder type or monitor direct view-type video tape recorder, a car navigation apparatus, a pager, an electronic pocket book, an electronic dictionary, a calculator, a word processor, a work station, a television phone, a POS terminal, a digital still camera, and the like.

What is claimed is:

1. A liquid crystal device, comprising:

a pair of polarizing plates having a transmission axis;

a display panel being disposed between the pair of polarizing plates and having a function of displaying an image; and a viewing angle control panel having a liquid crystal layer that is disposed at a position adjacent to one of the pair of polarizing plates between the pair of polarizing plates with liquid crystal molecules aligned in a predetermined direction and controlling a viewing angle of a display on the display panel, wherein the display panel has a liquid crystal layer in which the dielectric anisotropy is negative and has a vertical alignment mode in which circularly polarized light is emitted toward the viewing angle control panel, wherein a phase difference film for converting the circularly polarized light into linearly polarized light is provided between the display panel and the viewing angle control panel, and wherein the alignment direction of the liquid crystal molecules of the viewing angle control panel is substantially parallel or perpendicular to a transmission axis of the one polarizing plate.

2. The liquid crystal device according to claim 1, wherein the one polarizing plate is disposed on a viewing side in which the image on the display panel can be viewed.

3. The liquid crystal device according to claim 1, wherein light reaching the viewing angle control panel through the polarizing plates is substantially linearly polarized, and wherein the alignment direction of the liquid crystal molecules of the viewing angle control panel is substantially parallel or perpendicular to the transmission axis of the substantially linearly polarized light.

4. The liquid crystal device according to claim 1, further comprising: a viewing angle control circuit outputting a viewing angle control signal for driving the liquid crystal layer of the viewing angle control panel to the viewing angle control panel, wherein the viewing angle control panel is switched to any one of a wide viewing angle display mode for gaining a wide viewing angle and a narrow viewing angle display mode for gaining a narrow viewing angle on the basis of the viewing angle control signal output from the viewing angle control circuit.

5. The liquid crystal device according to claim 4, wherein a range of the viewing angle in the narrow viewing angle display mode is adjusted by changing a product $\Delta nd$ of a refractive anisotropy $\Delta n$ of the liquid crystal layer of the viewing angle control panel and a thickness d of the liquid crystal layer.

6. The liquid crystal device according to claim 1, further comprising another viewing angle control panel having a liquid crystal layer disposed between the pair of polarizing plates with the liquid crystal molecules aligned in a predetermined direction and controlling a viewing angle of the display panel, wherein the alignment direction of the liquid crystal molecules of the viewing angle control panel is substantially perpendicular to the alignment direction of the liquid crystal molecules of said another viewing angle control panel.

7. A liquid crystal device, comprising:

a pair of polarizing plates having a transmission axis;

a display panel being disposed between the pair of polarizing plates and having a function of displaying an image;

a viewing angle control panel having a liquid crystal layer that is disposed at a position adjacent to one of the pair of polarizing plates between the pair of polarizing plates with liquid crystal molecules aligned in a predetermined direction and controlling a viewing angle of a display on the display panel; and another viewing angle control panel having a liquid crystal layer disposed between the pair of polarizing plates with the liquid crystal molecules aligned in a predetermined direction and controlling a viewing angle of the display panel, wherein the alignment direction of the liquid crystal molecules of the viewing angle control panel is substantially perpendicular to the alignment direction of the liquid crystal molecules of said another viewing angle control panel, and wherein the alignment direction of the liquid crystal molecules of the viewing angle control panel is substantially parallel or perpendicular to a transmission axis of the one polarizing plate.

\* \* \* \* \*